(12) United States Patent
Yeon

(10) Patent No.: US 10,171,651 B2
(45) Date of Patent: Jan. 1, 2019

(54) ELECTRONIC DEVICE AND METHOD FOR CONFIGURING MESSAGE, AND WEARABLE ELECTRONIC DEVICE AND METHOD FOR RECEIVING AND EXECUTING THE MESSAGE

(71) Applicant: Samsung Electronics Co., Ltd., Suwon-si, Gyeonggi-do (KR)

(72) Inventor: Hun-Je Yeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/843,114

(22) Filed: Sep. 2, 2015

(65) Prior Publication Data
US 2016/0065727 A1   Mar. 3, 2016

(30) Foreign Application Priority Data
Sep. 3, 2014 (KR) .......................... 10-2014-0117247

(51) Int. Cl.
*H04M 1/725* (2006.01)

(52) U.S. Cl.
CPC ..... *H04M 1/72597* (2013.01); *H04M 1/7253* (2013.01); *H04M 1/72547* (2013.01); *H04M 1/7255* (2013.01); *H04M 1/72552* (2013.01)

(58) Field of Classification Search
CPC ........... H04M 1/72527; H04M 1/7253; H04M 1/72547; H04M 1/72597; H04M 1/72552; H04M 1/7255
USPC ............ 455/556.1, 569.1, 575.4; 379/420.04
See application file for complete search history.

(56) References Cited

U.S. PATENT DOCUMENTS

| | | | |
|---|---|---|---|
| 7,424,288 B2 | 9/2008 | Jung et al. | |
| 7,424,289 B2 | 9/2008 | Levien et al. | |
| 7,466,977 B2 | 12/2008 | Levien et al. | |
| 7,496,358 B2 | 2/2009 | Levien et al. | |
| 7,536,179 B2 | 5/2009 | Malamud et al. | |
| 7,715,873 B1 | 5/2010 | Biere et al. | |
| 8,064,968 B2 | 11/2011 | Levien et al. | |
| 8,078,156 B2 | 12/2011 | Levien et al. | |
| 8,081,959 B2 | 12/2011 | Levien et al. | |
| 8,090,794 B1 * | 1/2012 | Kilat ................ | G06F 17/30867 709/203 |
| 8,126,518 B2 | 2/2012 | Levien et al. | |
| 8,190,137 B2 | 5/2012 | Levien et al. | |
| 8,195,139 B2 | 6/2012 | Levien et al. | |
| 8,208,913 B2 | 6/2012 | Allen et al. | |

(Continued)

FOREIGN PATENT DOCUMENTS

EP   2658219 A2   10/2013
KR   10-2012-0015374 A   2/2012

OTHER PUBLICATIONS

European Search Report dated Feb. 8, 2018, issued in European Patent Application No. 15838488.3-1221.

*Primary Examiner* — Raymond Dean
(74) *Attorney, Agent, or Firm* — Jefferson IP Law, LLP

(57) ABSTRACT

An electronic device and a method for configuring a message, and a wearable electronic device and a method for receiving and executing the message are provided. The method includes detecting an event, configuring the message in response to the detected event, the message being executed on a wearable electronic device communicating with the electronic device, and transmitting the message to the wearable electronic device.

14 Claims, 12 Drawing Sheets

(56) References Cited

U.S. PATENT DOCUMENTS

| | | |
|---|---|---|
| 8,224,306 B2 | 7/2012 | Allen et al. |
| 8,811,951 B1 | 8/2014 | Faaborg et al. |
| 8,850,406 B1* | 9/2014 | Morrill .................... G06F 8/61 717/124 |
| 2006/0114852 A1 | 6/2006 | Levien et al. |
| 2006/0115066 A1 | 6/2006 | Levien et al. |
| 2006/0115067 A1 | 6/2006 | Levien et al. |
| 2006/0128306 A1 | 6/2006 | Jung et al. |
| 2006/0128307 A1 | 6/2006 | Levien et al. |
| 2006/0218191 A1* | 9/2006 | Gopalakrishnan ......................... G06F 17/3002 |
| 2008/0122796 A1* | 5/2008 | Jobs .................... G06F 3/0488 345/173 |
| 2008/0160960 A1 | 7/2008 | ElRif et al. |
| 2009/0017808 A1 | 1/2009 | Allen et al. |
| 2009/0029688 A1 | 1/2009 | Levien et al. |
| 2009/0029689 A1 | 1/2009 | Levien et al. |
| 2009/0029690 A1 | 1/2009 | Levien et al. |
| 2009/0061836 A1 | 3/2009 | Levien et al. |
| 2009/0098911 A1* | 4/2009 | Kim ...................... H04M 1/576 455/566 |
| 2009/0131026 A1 | 5/2009 | Allen et al. |
| 2009/0141663 A1 | 6/2009 | Levien et al. |
| 2009/0143053 A1 | 6/2009 | Levien et al. |
| 2009/0292780 A1* | 11/2009 | Ramesh .............. G06Q 10/107 709/206 |
| 2011/0059769 A1 | 3/2011 | Brunolli |
| 2012/0030379 A1 | 2/2012 | Won et al. |
| 2014/0045463 A1 | 2/2014 | Hsieh et al. |
| 2014/0045480 A1 | 2/2014 | Hsieh et al. |
| 2014/0045547 A1 | 2/2014 | Singamsetty et al. |
| 2014/0179284 A1* | 6/2014 | Song ...................... H04W 4/16 455/414.1 |
| 2014/0208193 A1* | 7/2014 | Parmar ................ G06F 3/0486 715/205 |
| 2015/0031294 A1* | 1/2015 | Holman ................ H04W 4/008 455/41.2 |
| 2015/0350143 A1* | 12/2015 | Yang ...................... H04L 51/22 345/173 |
| 2015/0358088 A1* | 12/2015 | Eim ...................... H04B 13/005 455/418 |

* cited by examiner

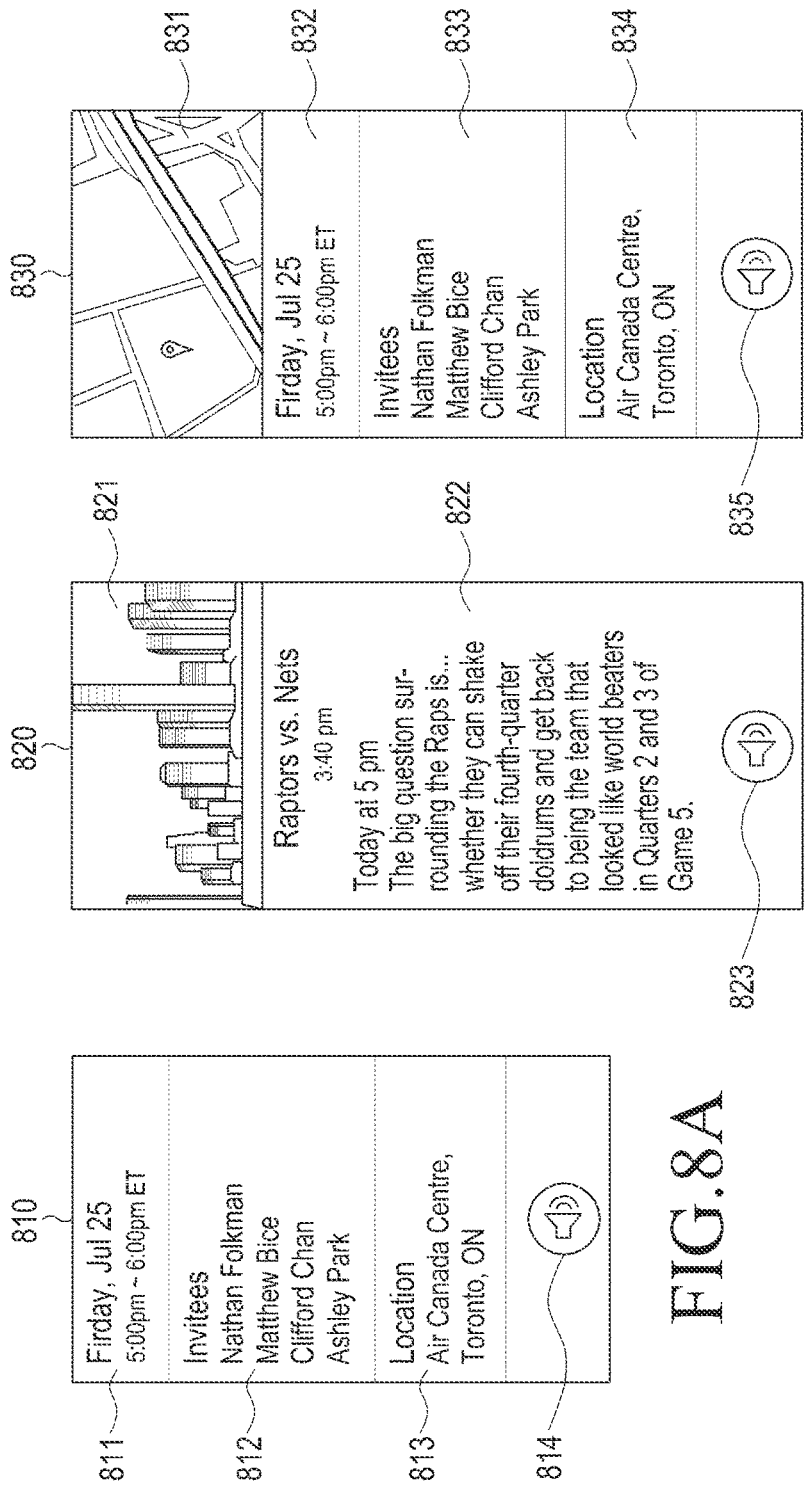

ELECTRONIC DEVICE AND METHOD FOR CONFIGURING MESSAGE, AND WEARABLE ELECTRONIC DEVICE AND METHOD FOR RECEIVING AND EXECUTING THE MESSAGE

CROSS-REFERENCE TO RELATED APPLICATION(S)

This application claims the benefit under 35 U.S.C. § 119(a) of a Korean patent application filed on Sep. 3, 2014 in the Korean Intellectual Property Office and assigned Serial number 10-2014-0117247, the entire disclosure of which is hereby incorporated by reference.

TECHNICAL FIELD

The present disclosure relates to an electronic device and a method for configuring a message. More particularly, the present disclosure relates to an electronic device and a method for configuring a message, and a wearable electronic device and a method for receiving and executing the message.

BACKGROUND

Currently, portable electronic devices are providing more various kinds of services and additional functions. In order to increase the effective value of such electronic devices and satisfy a user's various demands, various kinds of applications (application software programs) executable on an electronic device are being developed.

In addition, wearable electronic devices capable of communicating with such electronic devices are being developed. The wearable electronic devices can be worn on a user's body, and include, for example, a smart watch and smart glasses. An electronic device can transmit a message to a wearable electronic device, wherein the message includes only text.

When an electronic device according to the related art configures a message, the electronic device configures only the content of the message. For example, since an electronic device according to the related art does not provide information about a display format of a message, a message configured by the electronic device is monotonous and prosaic. In addition, since no wearable electronic device has a method of using its own functions, a wearable electronic device could only execute applications of an electronic device.

For this reason, there is a need to enable an electronic device to configure a message that is to be transmitted to a wearable electronic device using a certain format of template or a user selected format of template. In addition, there is a need to include functions that can be executed on a wearable electronic device in a message so that a user can execute at least one function through the message.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method for configuring a message.

Another aspect of the present disclosure is to provide a wearable electronic device and a method for executing a function corresponding to a message received from an electronic device.

In accordance with an aspect of the present disclosure, a method of configuring a message in an electronic device is provided. The method includes detecting an event, configuring the message in response to the detected event, the message being executed on a wearable electronic device communicating with the electronic device, and transmitting the message to the wearable electronic device.

In accordance with another aspect of the present disclosure, an electronic device of configuring a message is provided. The electronic device includes a communication interface configured to receive an event and a controller configured to configure a message in response to the received event, the message being executed on a wearable electronic device communicating with the electronic device, and transmit the message to the wearable electronic device.

In accordance with another aspect of the present disclosure, a method of executing a function on a wearable electronic device in response to a message received from an electronic device is provided. The method includes receiving a message from the electronic device, displaying a first template included in the received message, wherein the first template comprises an icon for executing at least one function corresponding to the received message, and executing the at least one function, if an input is detected when the first template is displayed.

In accordance with another aspect of the present disclosure, a wearable electronic device of executing a function corresponding to a message received from an electronic device is provided. The wearable electronic device includes a communication interface configured to receive a message from the electronic device, a display unit configured to display a first template included in the received message, and a controller configured to execute at least one function, if an input is detected when the first template is displayed.

In accordance with another aspect of the present disclosure, a method of configuring a message, transmitting the message, and executing a function using the transmitted message is provided. The method includes configuring, at an electronic device, the message in response to detection of an event, the message being executed on a wearable electronic device communicating with the electronic device, and transmitting the configured message to the wearable electronic device, displaying, at the wearable electronic device, a first template included in the message received from the electronic device, and executing at least one function if an input is detected when the first template is displayed.

In accordance with another aspect of the present disclosure, a system is provided. The system includes an electronic device of configuring a message and transmitting the message to a wearable electronic device, and the wearable electronic device of receiving the message and executing a function, wherein the electronic device configures a message in response to detection of an event, the message being executed on the wearable electronic device, and transmits the message to the wearable electronic device, and wherein the wearable electronic device displays a first template included in the message received from the electronic device, and executes at least one function if an input is detected when the first template is displayed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8A illustrates a second template according to an embodiment of the present disclosure;

FIG. 8B illustrates a second template according to an embodiment of the present disclosure;

FIG. 8C illustrates a second template according to an embodiment of the present disclosure;

Throughout the drawings, like reference numerals will be understood to refer to like parts, components, and structures.

DETAILED DESCRIPTION

Figure 1:
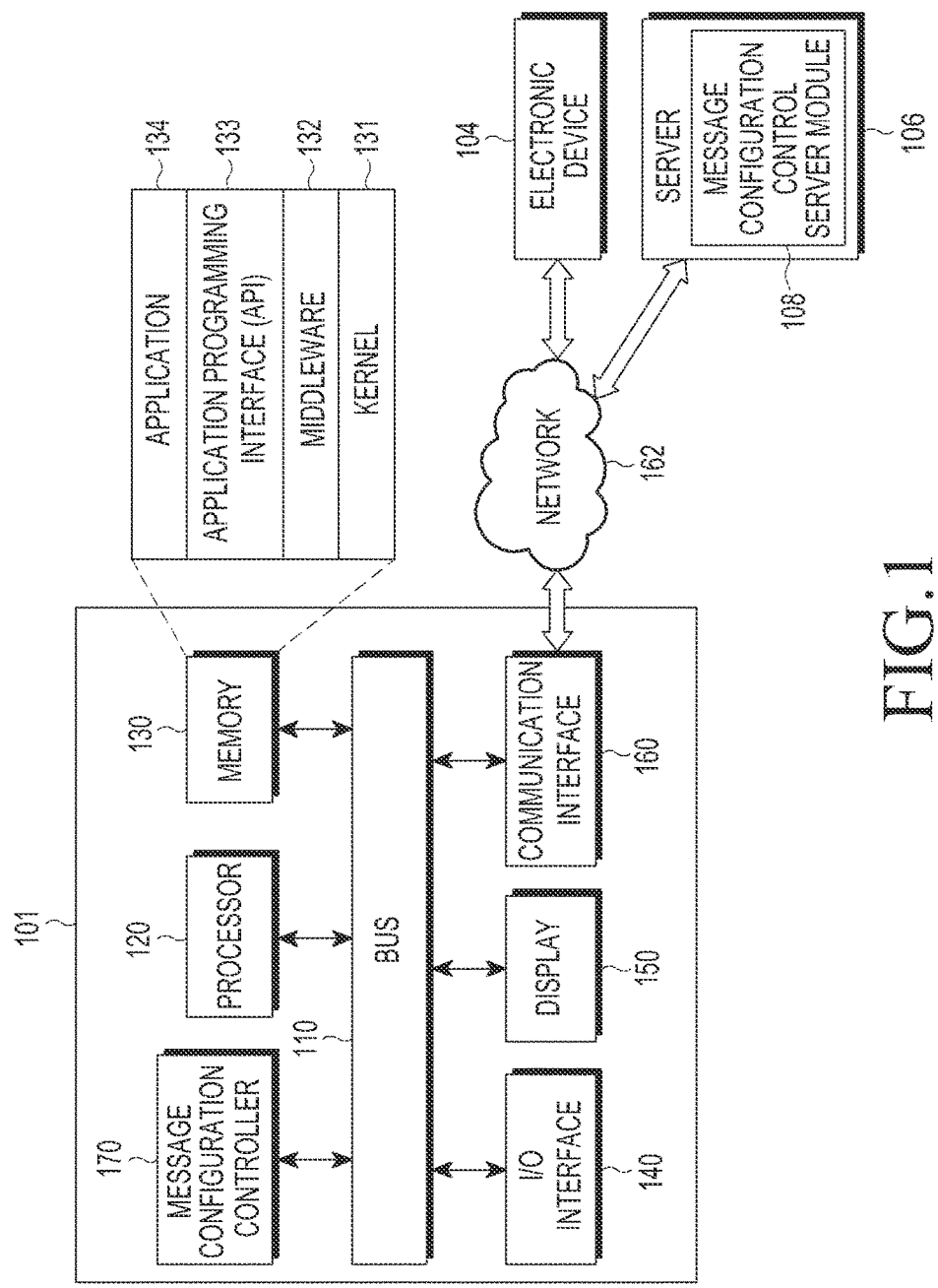
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It will be understood that the terms "comprises", "may comprise,", "includes" and/or "may include", when used herein, specify the presence of stated functions, operations, and/or components, but do not preclude the presence or addition of one or more other functions, and/or components. It will be further understood that the terms "comprises" or "has", when used herein, specify the presence of stated features, integers, operations, elements, components and/or groups thereof, but do not preclude the presence or addition of one or more other features, integers, operations, elements, components, and/or groups thereof.

As used herein, the term "or" includes any and all combinations of one or more of the associated listed items. For example, "A and/or B" may include A, B, or both A and B.

It will be understood that, although the terms first, second, and the like, may be used herein to describe various components, these components should not be limited by these terms. For example, the terms do not limit the order and/or importance of the components. These terms are only used to distinguish one component from another. For example, a first user device and a second user device that are user devices indicate different user devices. For example, a first component could be termed a second component, and, similarly, a second component could be termed a first component, without departing from the scope of the present disclosure.

It will be understood that when a component is referred to as being "connected" or "coupled" to another component, it can be directly connected or coupled to the other component or intervening components may be present. In contrast, when a component is referred to as being "directly connected" or "directly coupled" to another component, there are no intervening components present.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An electronic device, according to various embodiments of the present disclosure, may be a device with a display control function. For example, the electronic device may be at least one of a smart phone, a tablet personal computer (PC), a mobile phone, a video phone, an e-book reader, a desktop PC, a laptop PC, a netbook computer, a personal digital assistant (PDA), a portable multimedia player (PMP), a moving picture experts group (MPEG-1 or MPEG-2) audio layer 3 (MP3) player, a mobile medical equipment, a camera, or a wearable device (for example, a head-mounted-device (HMD), such as electronic glasses, electronic clothes, an electronic bracelet, an electronic necklace, an electronic appcessory, an electronic tattoo, a smart watch, and the like).

According to various embodiments of the present disclosure, the electronic device may be a smart home appliance with a display control function. The smart home appliance may be at least one of a television (TV), a digital versatile disc (DVD) player, audio equipment, a refrigerator, an air conditioner, a cleaner, an oven, a microwave, a washing machine, an air cleaner, a set-top box, a TV box (for example, Samsung HomeSync™, Apple TV™, or Google TV™), game consoles, electronic dictionary, an electronic key, a camcorder, or an electronic album.

According to various embodiments of the present disclosure, the electronic device may be at least one of various medical equipment (for example, magnetic resonance angiography (MRA), magnetic resonance imaging (MRI), computed tomography (CT), medical camcorder, ultrasonic equipment, and the like), a navigation device, a global positioning system (GPS) receiver, an event data recorder (EDR), a flight data recorder (FDR), an automotive infotainment device, electronic equipment for ship (for example, a marine navigation device, a gyro compass, and the like), avionics, security equipment, a head unit for vehicle, an industrial or home robot, an automatic teller machine (ATM) of bank, or a point of sales (PoS) of store.

According to various embodiments of the present disclosure, the electronic device may be at least one of part of furniture or building/structure, an electronic board, an electronic signature receiving device, a projector, or various metering equipment (for example, water, electricity, gas, or waves metering equipment), each of which has a display control function. The electronic device may be one of the aforementioned devices or a combination of one or more of the aforementioned devices. In addition, the electronic device may be a flexible device. It will be apparent to those of ordinary skill in the art that the electronic device according to various embodiments of the present disclosure is not limited to the aforementioned devices.

Hereinafter, an electronic device according to various embodiments of the present disclosure will be described with reference to the appended drawings. In the following description, the term "user" may indicate a person or an apparatus (for example, an intelligent electronic device) that uses the electronic device.

FIG. 1 illustrates a network environment including an electronic device according to various embodiments of the present disclosure.

Referring to FIG. 1, an electronic device 101 according to various embodiments of the present disclosure may include a bus 110, a processor 120, a memory 130, an input/output interface 140, a display unit 150, a communication interface 160, and a message configuration controller 170.

The electronic device 101 may be one of various kinds of electronic devices with data transmission/reception capability, which can perform arbitrary operation of configuring a message in response to an event and transmitting the message. The electronic device may be a smart phone, a mobile phone, a laptop computer, an air conditioner, a washing machine, a note PC, a tablet PC, a smart TV, and the like.

The bus 110 may be a circuit to connect the aforementioned components to each other, and to enable communications (for example, transmission of control messages) between the components.

The processor 120 may receive a command from the components (for example, the memory 130, the input/output interface 140, the display unit 150, the communication interface 160, or the message configuration controller 170) through the bus 110, interpret the received command, and then execute operation or data processing according to the interpreted command.

The memory 130 may store commands or data received from or generated by the processor 120 or the other components (for example, the input/output interface 140, the display unit 150, the communication interface 160, or the message configuration controller 170). The memory 130 may include programming modules, such as a kernel 131, middleware 132, an application programming interface (API) 133, or applications 134. Each of the programming modules may be software, firmware, hardware, or a combination of two or more of the aforementioned devices.

The kernel 131 may control or manage system resources (for example, the bus 110, the processor 120, or the memory 130) which the other programming modules (for example, the middleware 132, the API 133, or the application 134) use to execute their operations or functions. In addition, the kernel 131 may provide an interface to enable the middleware 132, the API 133, or the application 134 to access individual components of the electronic device 101 and to control or manage the components.

The middleware 132 may act as an intermediary so that the API 133 or the application 134 can communicate with the kernel 131 to receive/transmit data from/to the kernel 131. In addition, the middleware 132 may perform, when operation requests are received from the application 134 (or a plurality of applications 134), controlling (for example, scheduling or load balancing) for the operation requests, for example, by allocating priority capable of using a system resource (for example, the bus 110, the processor 120, or the memory 130) of the electronic device 101 to the application 134 (at least one of the plurality of applications 134).

The API 133 may be an interface to enable the application 134 to control functions that are provided by the kernel 131 or the middleware 132. The API 133 may include at least one interface or function (for example, commands), for example, for file control, window control, image processing, characters control, and the like.

According to various embodiments of the present disclosure, the applications 134 may include a short message service (SMS)/multimedia messaging service (MMS) application, an e-mail application, a calendar application, an alarm application, a health care application (for example, an application for measuring the quantity of motion, an application for measuring blood glucose, and the like), or an environmental information application (for example, an application of providing pressure, humidity, or temperature information). Additionally or alternatively, the application 134 may be an application related to information exchange between the electronic device 101 and an external electronic device (for example, an external electronic device 104). The application related to the information exchange may be a notification relay application for transferring specific information to the external electronic device, or a device management application for managing an external electronic device.

For example, the notification relay application may include a function of relaying notification information generated by another application (for example, an SMS/MMS application, an e-mail application, a health care application, or an environmental information application) of the electronic device 101 to an external electronic device (for example, the external electronic device 104). Additionally or alternatively, the notification relay application may receive notification information from, for example, an external electronic device (for example, the external electronic device 104), and provide the received notification information to a user. The device management application may turn on/off functions of an external electronic device (for example, the external electronic device 104 or some components of the external electronic device 104) that communicates with the electronic device 101, or functions of at least one component of the external electronic device, adjust the brightness (or, resolution) of a display, or manage (for example, install, delete, or update) an application that is executed on the external electronic device or a service (for example, a call service or a message service) that is provided by the external electronic device.

According to various embodiments of the present disclosure, the applications 134 may include an application designated according to an attribute (for example, the kind of electronic device) of the external electronic device (for example, the external electronic device 104). For example, if the external electronic device is an MP3 player, the applications 134 may include an application for playing music. Likewise, if the external electronic device is mobile medical equipment, the applications 134 may include an application related to health-care. According to an embodiment of the present disclosure, the applications 134 may include at least one of an application designated by the electronic device 101 and an application received from an external electronic device (for example, a server 106 or the external electronic device 104).

The input/output interface 140 may transfer a command or data received from a user through an input/output device (for example, a sensor, a display, a keyboard, a touch screen, and the like) to the processor 120, the memory 130, the communication interface 160, or the message configuration controller 170, for example, through the bus 110. For example, the input/output interface 140 may provide data about a user's touch input received through a touch screen to the processor 120. In addition, the input/output interface 140 may output a command or data received from the processor 120, the memory 130, the communication interface 160, or the application executing module 170, for example, via the bus 110, through an input/output device (for example, a speaker or a display). For example, the input/output interface 140 may output voice data processed by the processor 120, through a speaker, for a user.

The display unit 150 may display various information (for example, multimedia data or text data) for a user.

The communication interface 160 may allow communications between the electronic device 101 and an external device (for example, the external electronic device 104 or the server 106). For example, the communication interface 160 may connect to a network 162 through wireless/wired communication to communicate with the external device. The wireless communication may include at least one of, for example, Wi-Fi, bluetooth (BT), near field communication (NFC), GPS, or cellular communication (for example, long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM)). The wired communication may include at least one of, for example, universal serial bus (USB), high definition multimedia interface (HDMI), recommended standard 232 (RS-232), or plain old telephone service (POTS).

According to an embodiment of the present disclosure, the network 162 may be a telecommunication network. The telecommunication network may include at least one of a computer network, Internet, Internet of things (IoT), or a telephone network. According to an embodiment of the present disclosure, a protocol (for example, a transport layer protocol, a data link layer protocol, or a physical layer protocol) for communications between the electronic device 101 and an external device may be supported by at least one of the applications 134, the API 133, the middleware 132, the kernel 131, or the communication interface 160.

According to an embodiment of the present disclosure, the server 106 may perform at least one of operations (or functions) that are implemented on the electronic device 101, thereby supporting driving of the electronic device 101. For example, the server 106 may include a message configuration control server module 108 that can support the message configuration controller 170 implemented on the electronic device 101. For example, the message configuration control server module 108 may include at least one component of the message configuration controller 170 to perform (for example, execute) at least one of operations that are performed by the message configuration controller 170.

The message configuration controller 170 may configure a message in response to detection of an event such that the message can be executed on a wearable electronic device 210 that communicates with the electronic device 101, and transmit the configured message to the wearable electronic device 210.

The event may include at least one of a reception of a text message that is to be transferred to the wearable electronic device 210, reception of a call that is to be transferred to the wearable electronic device 210, reception of a missed call that is to be transferred to the wearable electronic device 210, and reception of e-mail that is to be transferred to the wearable electronic device 210. In addition, according to various embodiments of the present disclosure, the event may include reception of information that needs to be notified to a user, and generation of information, such as an alarm that needs to be notified to a user.

The message configuration controller 170 may configure a message including a first template, a second template, and an icon for executing at least one function corresponding to the detected event. The first template may include minimum content about the detected event, and the second template may include entire content about the detected event. The first template and the second template may include different content according to the kind of the event, and may be configured in different formats according to the kind of the event. In addition, the icon may be included in at least one of the first template and the second template. If the event is at least one of a reception of a text message including text and reception of e-mail including text, the message configuration controller 170 may configure a message including an icon for outputting the text as voice. For example, if an event corresponding to reception of e-mail occurs, a first template may include brief information about the e-mail, such as the name and picture of a user who sent the e-mail, the title of the e-mail, and the brief content of the e-mail. In addition, a second template may further include, in addition to the user's name and picture, the title of the e-mail, and the brief content of the e-mail, the entire content of the e-mail, and a time at which the e-mail has been received.

In addition, the message configuration controller 170 may configure a message including an icon (for example, a speaker-shaped icon) having a function for outputting the name and picture of the user who sent the e-mail, the title of the e-mail, and the content of the e-mail as voice. If the event is any one of a reception of a call and reception of a missed call, the message configuration controller 170 may configure a message including an icon for making a call. For example, if the event is an event notifying reception of a call or reception of a missed call, the message configuration controller 170 may configure a message including the name and picture of a user who made the call, a time at which the call has been made, and an icon (for example, a call icon) for making a call. The icon may be included in at least one of the first template and the second template. The first template may be a template that is displayed on the wearable electronic device 210 in response to reception of a message, and the second template may be a template that can be displayed if a command for displaying entire content is received when the first template is displayed. The first template and the second template may include the same content or different content. The first template may include brief content representing a kind of an event, and the second template may include entire content about the event. If the event is an event, such as an alarm which does not have a large amount of content, the message configuration controller 170 may configure a message with a single template, instead of a first template and a second template.

The message configuration controller 170 may configure a message using at least one of a certain format and a user selected format such that the message can be displayed or executed on the wearable electronic device 210. The message configuration controller 170 may search for a function or an application that can display, reproduce, or execute the configured message, from among functions and applications installed in the wearable electronic device 210. The message configuration controller 170 may determine at least one function installed in the wearable electronic device 210. If no function for executing the message has been installed in the wearable electronic device 210, the message configuration controller 170 may configure a message including information for displaying the message or for executing at least one function corresponding to the message. The information may include at least one of data for installing the at least one function and information for downloading the at least one function. The wearable electronic device 210 may use the information to download a function (for example, a program) for displaying or executing the message through the electronic device 101 or the Internet. The wearable electronic device 210 may connect to the electronic device 101 in a wired/wireless manner, and may be worn on a user's body part. The message configuration controller 170 may search for functions and/or applications installed in the wearable electronic device 210, and configure a message in a certain format such that the wearable electronic device 210 can display, reproduce, or execute the message received from the electronic device 101. In addition, the message configuration controller 170 may configure a message in a format selected by a user.

The message configuration controller 170 may process at least one part of information acquired from the other components (for example, the processor 120, the memory 130, the input/output interface 140, or the communication interface 160), and provide the results of the processing to a user in various ways. For example, the message configuration controller 170 may control at least one function of the electronic device 101 using the processor 120 or independently from the processor 120 so that the electronic device 101 interworks with another electronic device (for example, the external electronic device 104 or the server 106). According to an embodiment of the present disclosure, at least one component of the message configuration controller 170 may be included in the server 106 (for example, the message configuration control server module 108), and the server 106 may support at least one operation that can be implemented on the message configuration controller 170 for the message configuration controller 170. The message configuration controller 170 will be described with reference to FIGS. 2 to 12.

Figure 2A:
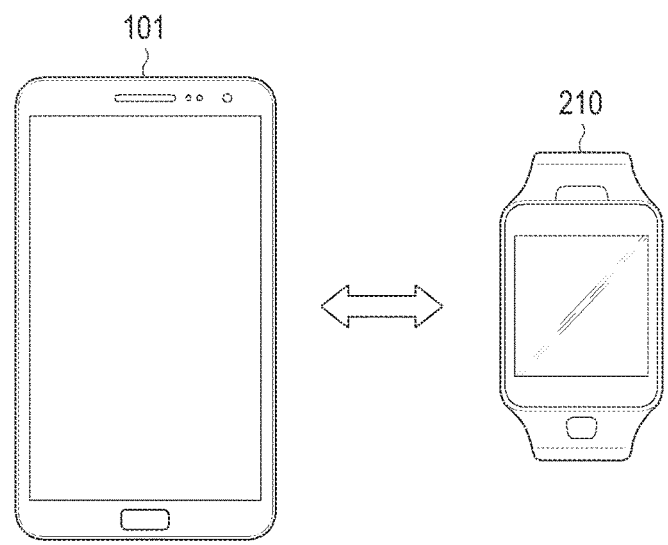
FIG. 2A illustrates an electronic device and a wearable electronic device of communicating with the electronic device according to various embodiments of the present disclosure.
Figure 2B:
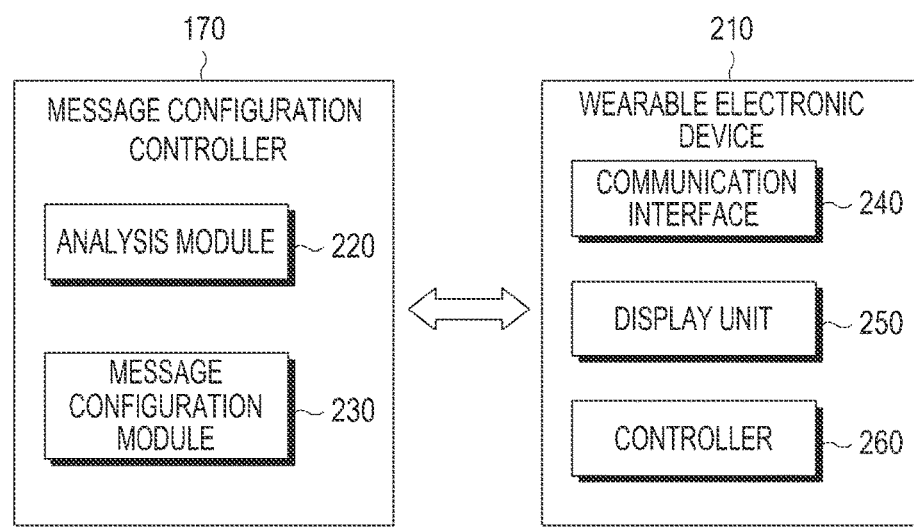
FIG. 2B illustrates a block diagram of a message configuration controller included in an electronic device, and a block diagram of a wearable electronic device of executing a message according to various embodiments of the present disclosure.

FIG. 2A illustrates an electronic device and a wearable electronic device of communicating with the electronic device according to various embodiments of the present disclosure, and FIG. 2B illustrates a block diagram of a message configuration controller included in an electronic device, and a block diagram of a wearable electronic device of executing a message according to various embodiments of the present disclosure.

Referring to FIG. 2A, the electronic device 101 may configure a message, and transmit the message to the wearable electronic device 210, and the wearable electronic device 210 may display or execute the received message.

The electronic device 101 may configure a message in response to detection of an event such that the message is executed on the wearable electronic device 210 communicating with the electronic device 101, and transmit the message to the wearable electronic device 210. The electronic device 101 may configure a message including a first template, a second template, and an icon for executing at least one function corresponding to the detected event. The electronic device 101 may determine at least one function installed in the wearable electronic device 210. If no function for executing the message has been installed in the electronic device 210, the electronic device 101 may configure a message including information for executing the message. The information may include at least one of data for installing the at least one function and information for downloading the at least one function. The electronic device 101 may configure a message using at least one of a predetermined (or certain) format and a user selected format such that the message can be displayed or executed on the wearable electronic device 210. If the event is at least one of a reception of a text message including text and reception of e-mail including text, the electronic device 101 may configure a message including an icon for outputting the text as voice. If the event is any one of a reception of a call and reception of a missed call, the electronic device 101 may configure a message including an icon for making a call.

The wearable electronic device 210 may display a first template included in the message received from the electronic device 101, and execute at least one function if an input is received when which the first template is displayed. If a message is received from the electronic device 101, the wearable electronic device 210 may display a first template included in the received message. The first template may include an icon for executing at least one function corresponding to the received message. If an input is detected when the first template is displayed, the wearable electronic device 210 may execute at least one function in response to the detection of the input. In addition, if the received message includes a second template, the wearable electronic device 210 may display the second template on the display unit 250 in response to the detection of the input. The wearable electronic device 210 may analyze a format constituting the received message, and display the received message, the first template, or the second template on a display unit 250, according to the result of the analysis. If at least one function that is to be executed in response to the received message is not installed in the wearable electronic device 210, the wearable electronic device 210 may use information included in the received message to download the at least one function (for example, a program or an application) from the electronic device 101 or to download the least one function from the server 106 through the network 162 and execute the at least one function. The information may include at least one of data for installing the at least one function and information for downloading the at least one function. If the received message is at least one of a text message including text and e-mail including text, the wearable electronic device 210 may execute at least one function for outputting the text as voice, in response to the detection of the input, and output the at least one of the text message and the e-mail as voice using the executed function. In addition, if the received message is any one of a reception of a call and reception of a missed call, the wearable electronic device 210 may call a user who made the call in response to the detection of the input.

Referring to FIG. 2B, the message configuration controller 170 of the electronic device 101 may include an analysis module 220 and a message configuration module 230, and the wearable electronic device 210 may include a communication interface 240, a display unit 250, and a controller 260.

According to an embodiment of the present disclosure, the message configuration controller 170 may configure a message such that the message is executed on the wearable electronic device 210. The message configuration controller 170 may configure a message including a first template, a second template, and an icon for executing at least one function in response to the detected event. The message configuration controller 170 may configure a message including a first template, a second template, and an icon for executing at least one function in response to the detected event. If no function for executing the message has been installed in the wearable electronic device 210, the message configuration controller 170 may configure a message including information for executing the message. The message configuration controller 170 may configure a message using at least one of a predetermined (or certain) format and a user selected format such that the message can be displayed or executed on the wearable electronic device 210. If the event is at least one of a reception of a text message including text and reception of e-mail including text, the message configuration controller 170 may configure a message including an icon for outputting the text as voice. If the event is any one of a reception of a call and reception of a missed call, the message configuration controller 170 may configure a message including an icon for making a call.

According to an embodiment of the present disclosure, the analysis module 220 of the message configuration controller 170 may detect an event generated in the electronic device 101, and analyze the detected event. The event may include at least one among reception of a text message that is to be transmitted to the wearable electronic device 210, reception of a call that is to be transferred to the wearable electronic device 210, reception of a missed call that is to be transferred to the wearable electronic device 210, and reception of e-mail that is to be transferred to the wearable electronic device 210. The analysis module 220 may notify the message configuration module 230 of the event in order for the message configuration module 230 to configure a message according to the kind of the event. According to various embodiments of the present disclosure, the event may include, other than reception of a text message, reception of a call, reception of a missed call, and reception of e-mail, reception of information that needs to be notified to a user, and generation of information, such as an alarm that needs to be notified to a user. The analysis module 220 may determine functions and applications installed in the wearable electronic device 210. For example, the analysis module 220 may determine at least one function installed in the wearable electronic device 210.

According to an embodiment of the present disclosure, the message configuration module 230 of the message configuration controller 170 may configure a message including a first template, a second template, and an icon for executing at least one function corresponding to the detected event, in response to the detection of the event. The first template may include minimum content about the detected event, and the second template may include entire content about the detected event. The first template and the second template may include different content according to the kind of the event, and may be configured in different formats according to the kind of the event. In addition, the icon may be included in at least one of the first template and the second template. If the event is at least one of a reception of a text message including text and reception of e-mail including text, the message configuration module 230 may configure a message including an icon for outputting the text as voice. For example, if an event corresponding to reception of e-mail occurs, a first template may include brief information, such as the name and picture of a user who sent the e-mail, the title of the e-mail, and the brief content of the e-mail. In addition, a second template may further include, in addition to the user's name and picture, the title of the e-mail, and the brief content of the e-mail, the entire content of the e-mail, and a time at which the e-mail has been received.

According to an embodiment of the present disclosure, the message configuration module 230 may configure a message including an icon (for example, a speaker-shaped icon) having a function for outputting the name and picture of the user who sent the e-mail, the title of the e-mail, and the content of the e-mail as voice. If the event is any one of a reception of a call and reception of a missed call, the message configuration controller 170 may configure a message including an icon for making a call. For example, if the event is any one of a reception of a call and reception of a missed call, the message configuration controller 170 may configure a message including the name and picture of a user who made the call, a time at which the call has been made, and an icon (for example, a call icon) for making a call. The first template may be a template that is displayed on the wearable electronic device 210 in response to reception of a message, and the second template may be a template that can be displayed if a command for displaying entire content is received when the first template is displayed. The first template and the second template may include the same content or different content. The first template may include brief content representing a kind of an event, and the second template may include entire content about the event. If the event is an event, such as an alarm which does not have a large amount of content, the message configuration module 230 may configure a message with a single template, instead of a first template and a second template.

According to an embodiment of the present disclosure, the message configuration module 230 may configure a message using at least one of a predetermined (or certain) format and a user selected format such that the message can be displayed or executed on the wearable electronic device 210. If no function for executing the message has been installed in the wearable electronic device 210, the message configuration module 230 may configure a message including information for displaying the message or for executing at least one function corresponding to the message.

The message configuration controller 170 may execute at least one function that is executed on at least one module of the analysis module 220 and the message configuration module 230. The message configuration controller 170 is simply referred to as a controller in the following description.

According to an embodiment of the present disclosure, the communication interface 240 of the wearable electronic device 210 may enable communication between the wearable electronic device 210 and an external device (for example, the electronic device 101 or the server 106). For example, the communication interface 240 may connect to the network 162 through wired/wireless communication to communicate with the external device. The wireless communication may include at least one of, for example, Wi-Fi, BT, NFC, GPS, and cellular communication (for example, LTE, LTE-A, CDMA, WCDMA, UMTS, WiBro, or GSM). The wired communication may include at least one of, for example, USB, HDMI, RS-232, or POTS.

According to an embodiment of the present disclosure, the display unit 250 of the wearable electronic device 210 may display various information (for example, multimedia data or text data) for a user. The display unit 250 may display a message that is received from the electronic device 101. The display unit 250 may display a first template of the message received from the electronic device 101. If an input according to a touch operation or a tap operation input is detected, the display unit 250 may display a second template included in the received message. In addition, the display unit 250 may display a screen on which a function corresponding to the received message is executed. For example, if the received message is a text message including text or e-mail including text, the display unit 250 may display the content of the text message or the content of the e-mail. If the received message is a message notifying reception of a call or reception of a missed call, the display unit 250 may display a screen notifying busy. In addition, if the received message is a message notifying a video call, the display unit 250 may display video of the other party.

According to an embodiment of the present disclosure, the controller 260 of the wearable electronic device 210 may control the display unit 250 to display a first template included in the message received from the electronic device 101, and control the wearable electronic device 210 to execute at least one function if an input is detected when the first template is displayed. If a message is received from the electronic device 101, the controller 260 may display a first template included in the received message on the display unit 250. The first template may include an icon for executing at least one function corresponding to the received message. If an input is detected when the first template is displayed, the controller 260 may execute the at least one function in response to the detection of the input. In addition, if the received message includes a second template, the controller 260 may display the second template on the display unit 250 in response to the detection of the input. The controller 260 may analyze a format constituting the received message, and display the received message, the first template, or the second template on the display unit 250, according to the result of the analysis. If no function that is to be executed in response to the received message has been installed, the controller 260 may use information included in the received message to download the at least one function (for example, a program or an application) from the electronic device 101 or to download the at least one function from the server 106 through the network 162 and execute the function. If the received message is at least one of a text message including text and e-mail including text, the controller 260 may execute at least one function for outputting the text as voice, in response to the detection of the input, and output the at least one of the text message and the e-mail as voice using the executed function. In addition, if the received message is any one of a reception of a call and reception of a missed call, the controller 260 may call a user who made the call in response to the detection of the input.

Figure 3:
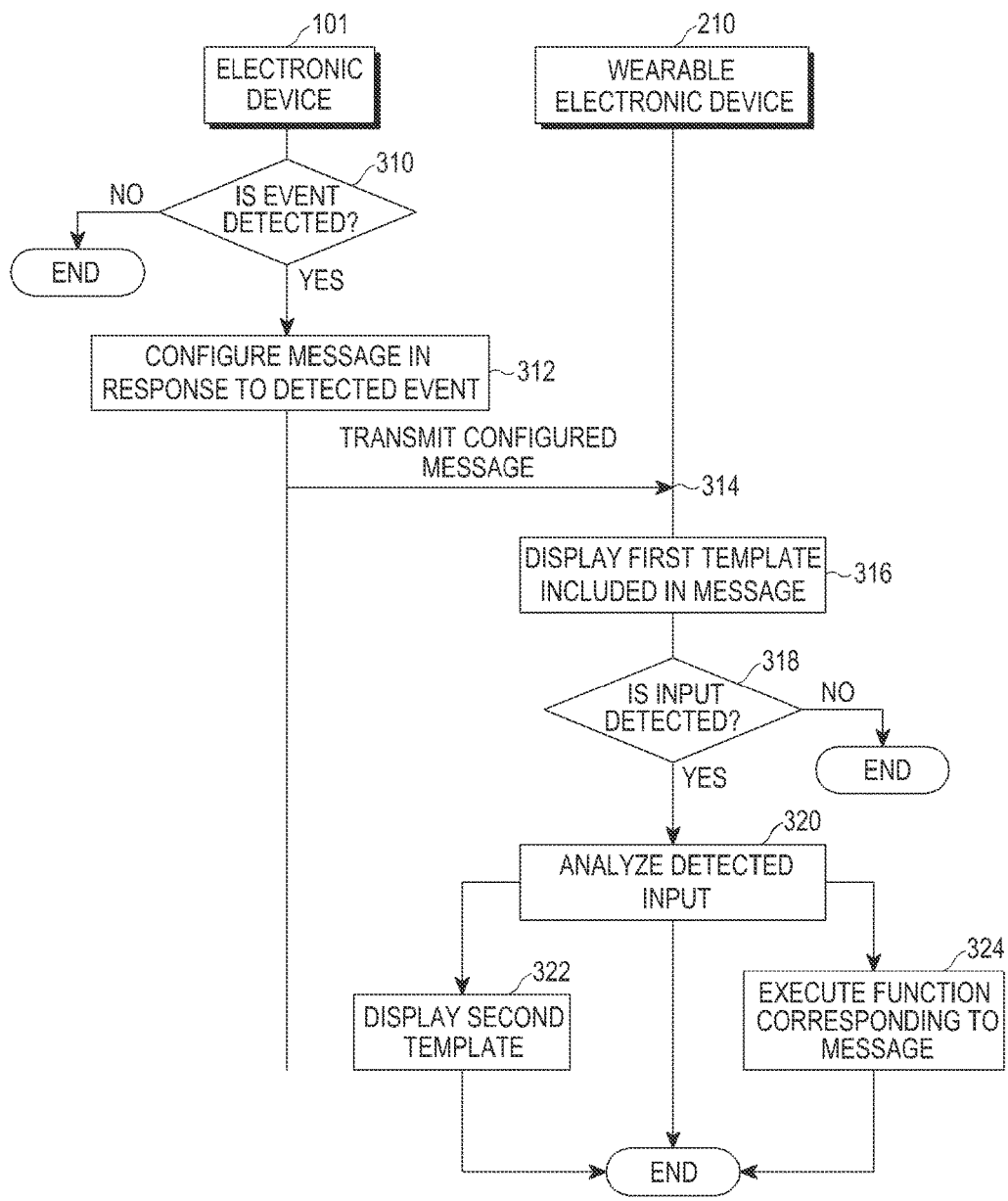
FIG. 3 is a flowchart illustrating a method in which an electronic device transmits a message, and a wearable electronic device executes a received message according to an embodiment of the present disclosure.

FIG. 3 is a flowchart illustrating a method in which an electronic device transmits a message, and a wearable electronic device executes a received message according to an embodiment of the present disclosure.

Hereinafter, a method in which the electronic device 101 according to an embodiment of the present disclosure transmits a message, and the wearable electronic device 210 executes a received message will be described with reference to FIG. 3.

Referring to FIG. 3, if an event is detected in operation 310, the electronic device 101 may configure a message in response to the detected event, in operation 312. More specifically, if an event is detected in operation 310, the electronic device 101 may analyze the detected event. At this time, the electronic device 101 may analyze the detected event to determine a kind or type of the event. The event may include at least one of a reception of a text message that is to be transferred to the wearable electronic device 210, reception of a call that is to be transferred to the wearable electronic device 210, reception of a missed call that is to be transferred to the wearable electronic device 210, and reception of e-mail that is to be transferred to the wearable electronic device 210. The electronic device 101 may configure a message including a first template, a second template, and an icon. The message may include a first template, a second template, and an icon for executing at least one function corresponding to the detected event, according to the kind or type of the event. In addition, the electronic device 101 may configure a message including any one of a first template, a second template, and an icon, according to the kind or type of the event. The first template may include minimum content about the detected event, and the second template may include entire content about the detected event. The first template and the second template may include different content according to the kind of the event, and may be configured in different formats according to the kind of the event. In addition, the icon may be included in at least one of the first template and the second template.

The electronic device 101 may configure a message using at least one of a certain format and a user selected format such that the message can be displayed or executed on the wearable electronic device 210. The electronic device 101 may configure a message through a function or application installed in the wearable electronic device 210 that can display, reproduce, or execute the configured message. If no function for executing the message has been installed in the wearable electronic device 210, the electronic device 101 may configure a message including information for displaying the message or for executing at least one function corresponding to the message. In addition, the electronic device 101 may configure a message using any one of a predetermined (or certain) format and a user selected format.

In operation 314, the electronic device 101 may transmit the configured message to the wearable electronic device 210. The electronic device 101 may transmit the configured message to the wearable electronic device 210 that can be connected to the electronic device 101 in a wired/wireless manner. The electronic device 101 may configure a message in real time in response to the detection of the event, and transmit the configured message to the wearable electronic device 210. The electronic device 101 may transmit the configured message to the wearable electronic device 210 through at least one of Wi-Fi, BT, NFC, GPS, cellular communication (for example, LTE, LTE-A, CDMA, WCDMA, UMTS, WiBro, or GSM), USB, HDMI, RS-232, and POTS.

In operation 316, the wearable electronic device 210 may display a first template included in the message received from the electronic device 101. If a message is received from the electronic device 101, the wearable electronic device 210 may display a first template included in the received message in real time on the display unit 250. The received message may include at least one of a first template, a second template, and an icon, according to the kind of the event. The first template may include minimum content about the detected event, and the second template may include entire content about the detected event. The first template and the second template may include different content according to the kind of the event, and may be configured in different formats according to the kind of the event. In addition, the icon may be included in at least one of the first template and the second template. The first template may include an icon for executing at least one function corresponding to the received message.

If an input is detected in operation 318, the wearable electronic device 210 may analyze the detected input, in operation 320. More specifically, if an input is detected, the wearable electronic device 210 may determine whether the detected input is an input for displaying a second template or an input for executing at least one function corresponding to the received message. The input may be an input according to at least one of a touch operation, a tap operation, and a hovering operation. For example, the wearable electronic device 210 may determine an input for displaying a second template by detecting operation of touching or tapping a certain area of the first template displayed in operation 316. In addition, the wearable electronic device 210 may determine an input for executing the at least one function by detecting operation of touching or tapping an icon included in the first template.

If it is determined in operation 320 that the detected input is analyzed as an input for displaying a second template, the wearable electronic device 210 may display a second template, in operation 322. The input may be operation of touching a predetermined (or certain) area of the display unit 250 for displaying the second template. The first template may include brief content representing a kind of an event, and the second template may include entire content about the event. If the event is an event, such as an alarm which does not have a large amount of content, the message configuration controller 170 may configure a message with a single template, and the wearable electronic device 210 may display the single template. For example, if the message received from the electronic device 101 is a message corresponding to an event notifying reception of e-mail, the wearable electronic device 210 may display a first template including brief information including the name and picture of a user who sent the e-mail, the title of the e-mail, and the brief content of the e-mail, and an icon (for example, a speaker-shaped icon) for outputting the e-mail as voice. If an input detected in operation 318 when the first template is displayed is an input for displaying a second template, the wearable electronic device 210 may display a second template including all content included in the e-mail. The second template may be a template that can be displayed if a command for displaying entire content is received when the first template is displayed.

If the input analyzed in operation 320 is an input for executing at least one function corresponding to the received message, the wearable electronic device 210 may execute a function corresponding to the message, in operation 324. The input may be operation of touching or tapping an icon included in the second template. If the detected input is an input for executing a function corresponding to the received message, the wearable electronic device 210 may execute at least one function corresponding to the received message among one or more functions installed therein. For example, if the received message is at least one of a text message including text and e-mail including text, the wearable electronic device 210 may execute at least one function for outputting the text as voice, in response to the detection of the input, and output the at least one of the text message and the e-mail as voice using the executed function. In addition, if the received message is any one of a reception of a call and reception of a missed call, the wearable electronic device 210 may call a user who made the call in response to the detection of the input.

Figure 4:
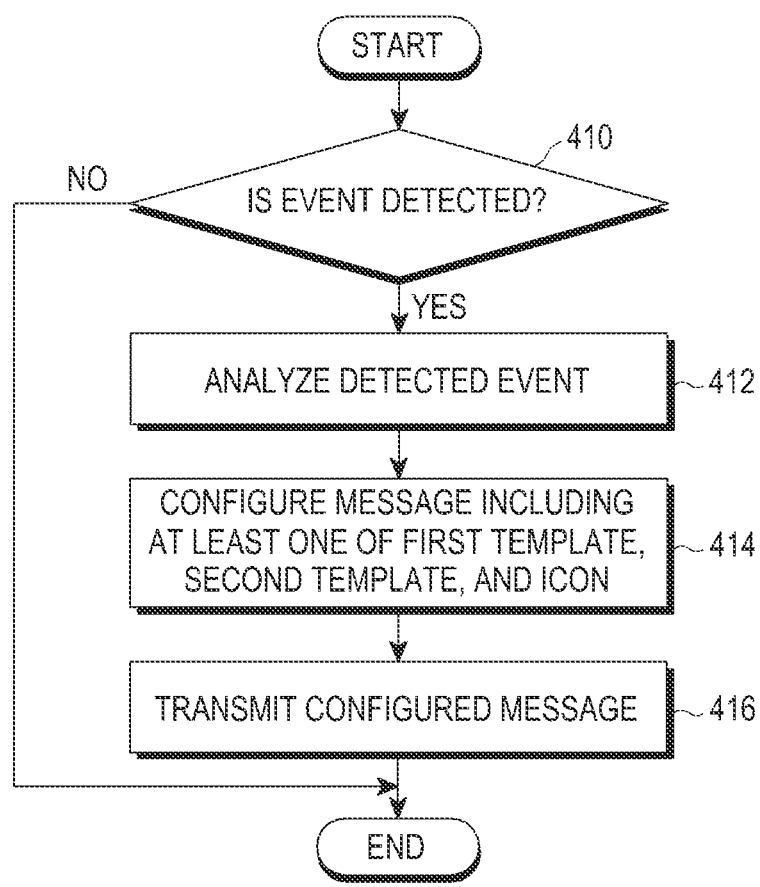
FIG. 4 is a flowchart illustrating a method in which an electronic device configures a message, and transmits the configured message to a wearable electronic device according to an embodiment of the present disclosure.

FIG. 4 is a flowchart illustrating a method in which the electronic device 101 configures a message, and transmits the configured message to a wearable electronic device according to an embodiment of the present disclosure.

Hereinafter, a method in which the electronic device 101 according to an embodiment of the present disclosure configures a message, and transmits the configured message to the wearable electronic device 210 will be described with reference to FIG. 4.

Referring to FIG. 4, if an event is detected in operation 410, the electronic device 101 may analyze the detected event, in operation 412. More specifically, if an event is detected, the electronic device 101 may determine the kind or type of the detected event. The event may include at least one among reception of a text message that is to be transferred to the wearable electronic device 210, reception of a call that is to be transferred to the wearable electronic device 210, reception of a missed call that is to be transferred to the wearable electronic device 210, and reception of e-mail that is to be transmitted to the wearable electronic device 210. In addition, according to various embodiments of the present disclosure, the event may include reception of information that needs to be notified to a user, and generation of information, such as an alarm that needs to be notified to a user.

In operation 414, the electronic device 101 may configure a message including a first template, a second template, and an icon. If the event is detected, the electronic device 101 may configure a message in response to the detected event. The message may include a first template, a second template, and an icon for executing at least one function corresponding to the detected event, according to the kind or type of the event. The electronic device 101 may configure a message including any one of a first template, a second template, and an icon, according to the kind or type of the event. The first template may include minimum content about the detected event, and the second template may include entire content about the detected event. The first template and the second template may include different content according to the kind of the event, and may be configured in different formats according to the kind of the event. In addition, the icon may be included in at least one of the first template and the second template. If the event is at least one of a reception of a text message including text and reception of e-mail including text, the electronic device 101 may configure a message including an icon for outputting the text as voice. For example, if an event corresponding to reception of e-mail occurs, the first template may include brief information about the e-mail, such as the name and picture of a user who sent the e-mail, the title of the e-mail, and the brief content of the e-mail. In addition, the second template may further include, in addition to the user's name and picture, the title of the e-mail, and the brief content of the e-mail, the entire content of the e-mail, and a time at which the e-mail has been received.

In addition, the message configuration controller 170 may configure a message including an icon (for example, a speaker-shaped icon) having a function for outputting the name and picture of the user who sent the e-mail, the title of the e-mail, and the content of the e-mail as voice. If the event is any one of a reception of a call and reception of a missed call, the electronic device 101 may configure a message including an icon for making a call. For example, if the event is an event notifying reception of a call or reception of a missed call, the electronic device 101 may configure a message including the name and picture of a user who made the call, a time at which the call has been made, and an icon (for example, a call icon) for making a call. The icon may be included in at least one of the first template and the second template. If the event is an event, such as an alarm which does not have a large amount of content, the electronic device 101 may configure a message with a single template, instead of a first template and a second template.

The electronic device 101 may configure a message using at least one of a predetermined (or certain) format and a user selected format such that the message can be displayed or executed on the wearable electronic device 210. The electronic device 101 may search for a function or an application that can display, reproduce, or execute the configured message, from among functions and applications installed in the wearable electronic device 210. The electronic device 101 may determine at least one function installed in the wearable electronic device 210. If no function for executing the message has been installed in the wearable electronic device 210, the electronic device 101 may configure a message including information for displaying the message or for executing at least one function corresponding to the message. The information may include at least one of data for installing the at least one function and information for downloading the at least one function. In addition, the electronic device 101 may configure a message using any one of a certain format and a user selected format.

In operation 416, the electronic device 101 may transmit the configured message. The electronic device 101 may transmit the configured message to the wearable electronic device 210 that can be connected to the electronic device 101 in a wired/wireless manner. The electronic device 101 may configure a message in real time in response to detection of an event, and transmit the configured message to the wearable electronic device 210.

The electronic device 101 may transmit the configured message to the wearable electronic device 210 through at least one of Wi-Fi, BT, NFC, GPS, cellular communication (for example, LTE, LTE-A, CDMA, WCDMA, UMTS, WiBro, or GSM), USB, HDMI, RS-232, and POTS.

Figure 5:
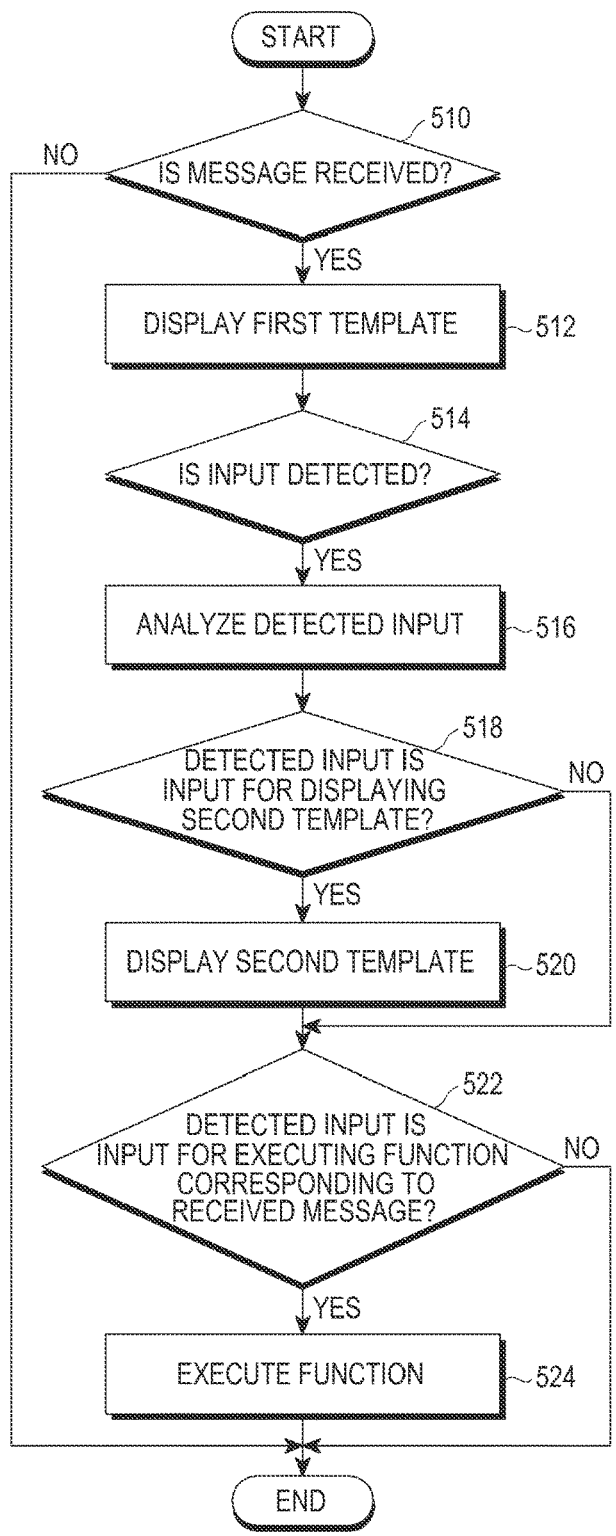
FIG. 5 is a flowchart illustrating a method in which a wearable electronic device executes a function corresponding to a message received from an electronic device according to an embodiment of the present disclosure.

FIG. 5 is a flowchart illustrating a method in which a wearable electronic device executes a function corresponding to a message received from an electronic device according to an embodiment of the present disclosure.

Hereinafter, a method in which the wearable electronic device 210 executes a function corresponding to a message received from the electronic device 101 according to an embodiment of the present disclosure will be described with reference to FIG. 5.

Referring to FIG. 5, if a message is received in operation 510, the wearable electronic device 210 may display a first template in operation 512.

More specifically, the wearable electronic device 210 may display a first template included in a message received from the electronic device 101. If a message is received from the electronic device 101, the wearable electronic device 210 may display a first template included in the received message in real time on the display unit 250. The received message may include at least one of a first template, a second template, and an icon, according to the kind of the event. The first template may include minimum content about the detected event, and the second template may include entire content about the detected event. The first template and the second template may include different content according to the kind of the event, and may be configured in different formats according to the kind of the event. In addition, the icon may be included in at least one of the first template and the second template. The first template may include an icon for executing at least one function corresponding to the received message. The wearable electronic device 210 may display a first template of a message received from the electronic device 101 on the display unit 250, and if a touch input or a tap input is detected, the wearable electronic device 210 may display a second template included in the received message on the display unit 250. In addition, the wearable electronic device 210 may display a screen on which a function corresponding to the received message is executed on the display unit 250. For example, if the received message is at least one of a text message including text and e-mail including text, the wearable electronic device 210 may display the content of the text message or the content of the e-mail on the display unit 250. If the received message is a message notifying reception of a call or reception of a missed call, the wearable electronic device 210 may display a screen notifying busy on the display unit 250. In addition, if the received message is a message notifying a video call, the wearable electronic device 210 may display video of the other party on the display unit 250.

If an input is detected in operation 514, the wearable electronic device 210 may analyze the detected input, in operation 516. More specifically, the wearable electronic device 210 may determine whether the detected input is an input for displaying a second template or an input for executing at least one function corresponding to the received message. The input may be an input according to at least one of a touch operation, a tap operation, and a hovering operation.

If it is determined in operation 518 that the input detected in operation 514 is an input for displaying a second template, the wearable electronic device 210 may display a second template, in operation 520. The input may be operation of touching a predetermined (or certain) area of the display unit 250 that displays the second template. The first template may be a template that is displayed on the wearable electronic device 210 in response to the reception of the message, and the second template may be a template that can be displayed if a command for displaying entire content is received when the first template is displayed. The first template and the second template may include the same content or different content. The first template may include brief content representing a kind of an event, and the second template may include entire content about the event. If the event is an event, such as an alarm which does not have a large amount of content, the message configuration controller 170 may configure a message with a single template, and the wearable electronic device 210 may display the single template. For example, if the message received from the electronic device 101 is a message corresponding to an event notifying reception of e-mail, the wearable electronic device 210 may display a first template including brief information about the e-mail, such as the name and picture of a user who sent the e-mail, the title of the e-mail, and the brief content of the e-mail, and an icon (for example, a speaker-shaped icon) for outputting the e-mail as voice. If an input detected in operation 514 when the first template is displayed is an input for displaying a second template, the wearable electronic device 210 may display a second template including all content included in the e-mail. The second template may be a template that can be displayed if a command for displaying entire content is received when the first template is displayed. The second template may include different content according to the kind of the event, and may be configured in different formats according to the kind of the event.

In addition, if the input detected in operation 514 is an input for executing a function corresponding to the received message in operation 522, the wearable electronic device 210 may execute the function, in operation 524. The input may be operation of touching or tapping an icon included in the second template. If the detected input is an input for executing a function corresponding to the received message, the wearable electronic device 210 may execute at least one function corresponding to the received message among one or more functions installed in the wearable electronic device 210. For example, if the received message is at least one of a text message including text or e-mail including text, the wearable electronic device 210 may execute at least one function for outputting the text as voice in response to the detection of the input, and output at least one of the text message and the e-mail as voice using the executed function. In addition, if the received message is any one of a reception of a call and reception of a missed call, the wearable electronic device 210 may call a user who made the call, in response to the detection of the input.

Figure 6A:
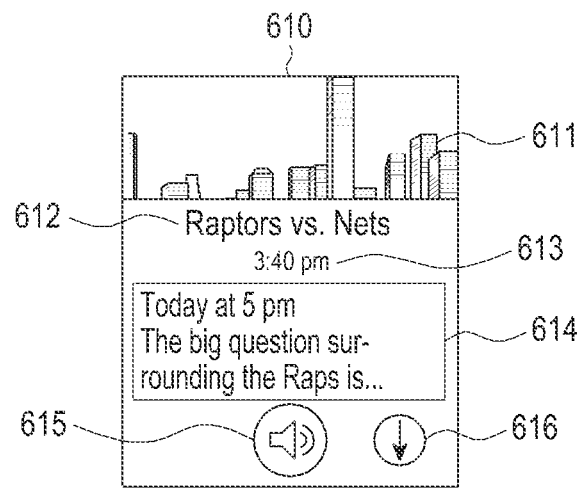
FIG. 6A illustrates a first template included in a message according to an embodiment of the present disclosure.
Figure 6B:
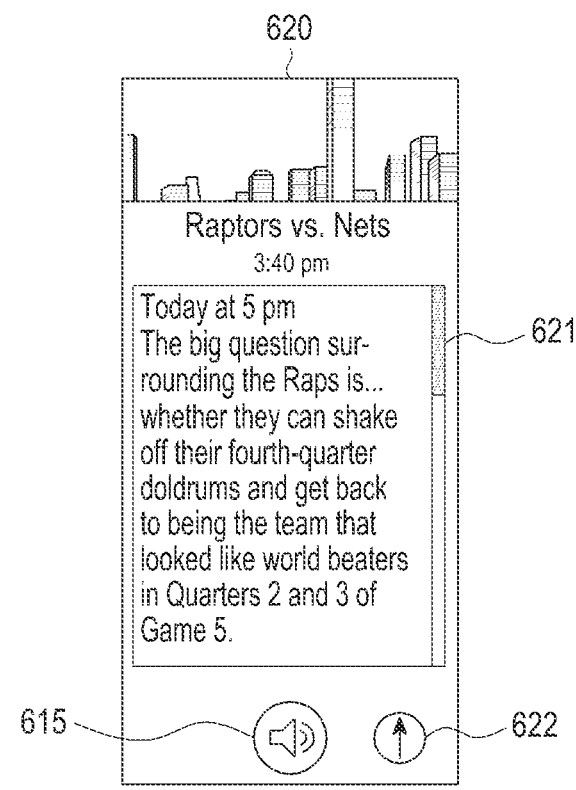
FIG. 6B illustrates a second template included in a message according to an embodiment of the present disclosure.

FIG. 6A illustrates a first template included in a message according to an embodiment of the present disclosure, and FIG. 6B illustrates a second template included in a message according to an embodiment of the present disclosure.

Referring to FIG. 6A, the electronic device 101 may configure a message including a first template 610. The first template 610 may be displayed on the wearable electronic device 210. The first template 610 included in the message configured in response to detection of an event may include an image 611 corresponding to the message, a title 612 of the message, a time 613 at which the event has been detected or at which the message has been configured, a content 614 about the event, an icon 615 for executing the message, and an icon 616 for receiving an input for displaying a second template. The image 611 may depend on the kind or type of the event, and may be an image stored in the electronic device 101 or an image corresponding to the event. The size of the image 611 may be adjusted. The content 614 may be a first part or an important part of content corresponding to the event. In addition, the icon 615 may be an icon for outputting the content 614 included in the message as voice. In addition, the icon 616 may be an icon for showing the entire content of the message. If the icon 616 is touched or selected, the size of the image 611 may be adjusted so that a second template 620 as shown in FIG. 6B can be displayed on the wearable electronic device 210.

Referring to FIG. 6B, the electronic device 101 may configure a message including the second template 620. The second template 620 may be displayed on the wearable electronic device 210. The second template 620 included in the message configured in response to the detection of the event may include all text included in the content 614 of the first template 610. For example, the second template 620 may include a scroll bar 621 according to the size of the display unit 250 of the wearable electronic device 210. In addition, the icon 615 included in the second template 620 may be an icon for outputting text included in the second template 620 as voice. If an icon 622 included in the second template 620 is touched or tapped, the size of the second template 620 may be adjusted to display the first template 610 on the wearable electronic device 210.

Figure 7C:
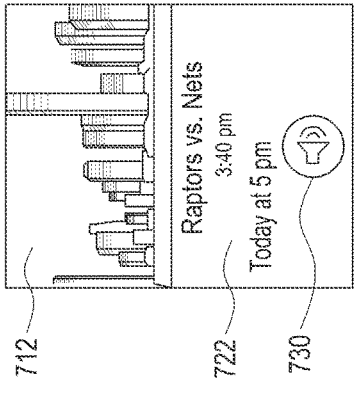
FIG. 7C illustrates a first template when an image of the first template is enlarged according to an embodiment of the present disclosure.
Figure 7B:
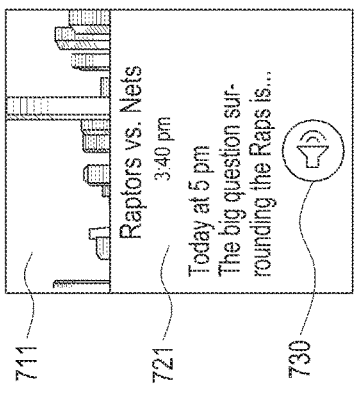
FIG. 7B illustrates a first template when an image of the first template is maintained with a normal size according to an embodiment of the present disclosure.
Figure 7A:
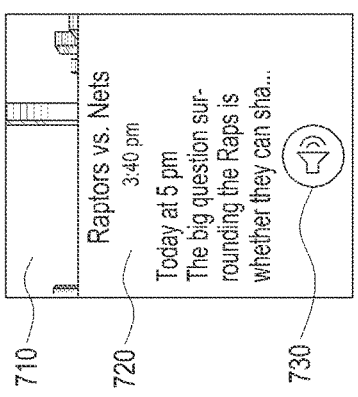
FIG. 7A illustrates a first template when an image of the first template is reduced according to an embodiment of the present disclosure.
Figure 7F:
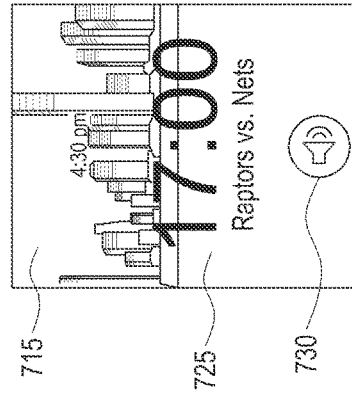
FIG. 7F illustrates a first template when a clock and a title overlap the first template according to an embodiment of the present disclosure.
Figure 7E:
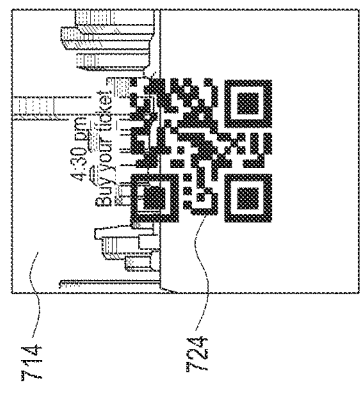
FIG. 7E illustrates a first template when a quick response (QR) code overlaps the first template according to an embodiment of the present disclosure.
Figure 7D:
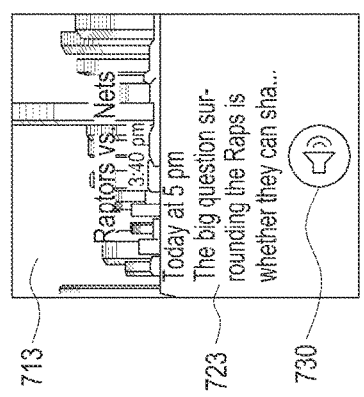
FIG. 7D illustrates a first template when text overlaps the first template according to an embodiment of the present disclosure.

FIG. 7A illustrates a first template when an image of the first template is reduced according to an embodiment of the present disclosure, FIG. 7B illustrates a first template when the image of the first template is maintained with a normal size according to an embodiment of the present disclosure, FIG. 7C illustrates a first template when the image of the first template is enlarged according to an embodiment of the present disclosure, FIG. 7D illustrates a first template when text overlaps the first template according to an embodiment of the present disclosure, FIG. 7E illustrates a first template when a quick response (QR) code overlaps the first template according to an embodiment of the present disclosure, and FIG. 7F illustrates a first template when a clock and a title overlap the first template according to an embodiment of the present disclosure.

The electronic device 101 according to various embodiments of the present disclosure may create a first template in various formats when configuring a message. FIGS. 7A, 7B, 7C, 7D, 7E, and 7F show examples of various first templates. Formats that are used to create the first templates may be predetermined (or certain) formats or formats configured by a user.

Referring to FIG. 7A, the electronic device 101 may configure a message including a first template. The first template may be displayed on the wearable electronic device 210. The first template according to an embodiment of the present disclosure may include an image 710, a content 720 corresponding to an event, and an icon 730 for outputting the content 720 as voice. The image 710 may depend on the kind or type of the event, and may be an image stored in the electronic device 101 or an image corresponding to the event. The size of the image 710 may be adjusted. The content 720 may be displayed in the remaining area except for the image 710 on the display unit 250. FIG. 7A illustrates the first template including the image 710 with the smallest size, and in the example of FIG. 7A, the content 720 may be displayed over the wider area than the other templates.

Referring to FIG. 7B, a first template according to an embodiment of the present disclosure may include an image 711, a content 721 corresponding to an event, and an icon 730 for outputting the content 721 as voice. The image 711 may depend on the kind or type of the event, and may be an image stored in the electronic device 101 or an image corresponding to the event. The size of the image 711 may be adjusted. The content 721 may be displayed in the remaining area except for the image 711 on the display unit 250. FIG. 7B illustrates a first template including the image 711 with a normal size, and in the example of FIG. 7B, the content 721 may be displayed over the narrower area than the content 720 of FIG. A.

Referring to FIG. 7C, a first template according to an embodiment of the present disclosure may include an image 712, a content 722 corresponding to an event, and an icon 730 for outputting the content 722 as voice. The image 712 may depend on the kind or type of the event, and may be an image stored in the electronic device 101 or an image corresponding to the event. The size of the image 712 may be adjusted. The content 722 may be displayed in the remaining area except for the image 712 on the display unit 250. FIG. 7C illustrates a first template including the image 712 with the largest size, and in the example of FIG. 7C, the content 722 may be displayed over the narrower area than the content 721 of FIG. B.

Referring to FIG. 7D, a first template according to an embodiment of the present disclosure may include an image 713, a content 723 corresponding to an event, and an icon 730 for outputting the content 722 as voice. The image 713 may depend on the kind or type of the event, and may be an image stored in the electronic device 101 or an image corresponding to the event. The size of the image 713 may be adjusted. The content 723 may overlap the image 713.

Referring to FIG. 7E, a first template according to an embodiment of the present disclosure may include an image 714, and a QR code 724 including content corresponding to an event. For example, if the QR code 724 is identified by a module for identifying QR codes, installed in the electronic device 101 or the wearable electronic device 210, a content corresponding to the QR code 724 may be displayed on the display unit 150 or 250 or output as voice. The first template including the QR code 724 may depend on the kind or type of the event. In addition, the QR code 724 may overlap the image 714.

Referring to FIG. 7F, a first template according to an embodiment of the present disclosure may include an image 715, a content 725 including a time at which an event has been detected or at which a message has been configured, and the title of the event, and an icon 730 for outputting the content 725 as voice. The image 715 may depend on the kind or type of the event, and may be an image stored in the electronic device 101 or an image corresponding to the event. The size of the image 715 may be adjusted. The content 725 may overlap the image 715. The first temple corresponding to any one of those shown in FIGS. 7A to 7F may be displayed on the display unit 250 of the wearable electronic device 210, and if a touch input or a tap input is detected on the display unit 250, a second template as shown in FIGS. 8A, 8B, and 8C may be displayed.

FIG. 8A illustrates a second template according to an embodiment of the present disclosure, FIG. 8B illustrates a second template according to an embodiment of the present disclosure, and FIG. 8C illustrates a second template according to an embodiment of the present disclosure.

The electronic device 101 according to various embodiments of the present disclosure may create a second template in various formats when configuring a message. FIGS. 8A, 8B, and 8C illustrate various second templates. Formats that are used to create the second templates may be predetermined (or certain) formats or formats configured by a user.

FIGS. 8A, 8B, and 8C illustrates second templates created when a detected event is reception of e-mail including an invitation.

Referring to FIG. 8A, a second template 810 according to a first example may include a date 811 of invitation, invitees 812, a place 813 of invitation, and an icon 814 for receiving an input for outputting content of the second template 810 as voice.

Referring to FIG. 8B, a second template 820 according to a second example may include an image 821, a content 822, and an icon 823 for receiving an input for outputting content of the second template 820 as voice.

Referring to FIG. 8C, a second template 830 according to a third example may include an image 831 showing the location of the place of invitation on a map, a date 832 of invitation, invitees 833, a place 834 of invitation, and an icon 835 for receiving an input for outputting the content of the second template 830 as voice.

Figures 9A, 9B:
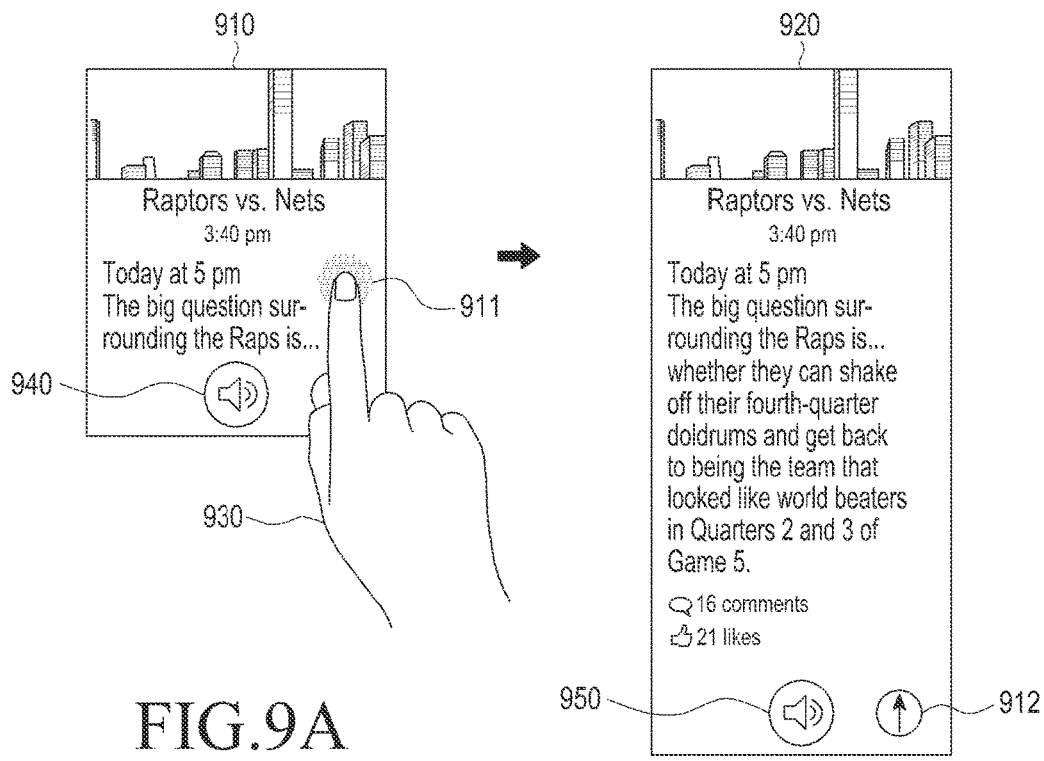
FIG. 9A illustrates a first template when the first template is touched according to an embodiment of the present disclosure.
FIG. 9B illustrates a second template that is displayed when a first template is touched according to an embodiment of the present disclosure.

FIG. 9A illustrates a first template when the first template is touched according to an embodiment of the present disclosure, and FIG. 9B illustrates a second template that is displayed when a first template is touched according to an embodiment of the present disclosure.

Referring to FIG. 9A, a first template 910 may include minimum content about a detected event. If an input 930 of touching or tapping a certain area 911 is detected when the first template 910 is displayed on the display unit 250 of the wearable electronic device 210, the wearable electronic device 210 may display a second template as shown in FIG. 9B on the display unit 250. In addition, if an input of touching or tapping an icon 940 is detected when the first template 910 is displayed, the content of the first template 910 may be output as voice.

Referring to FIG. 9B, a second template 920 may include a maximum size of content or entire content about the detected event. In addition, the second template 920 may be converted to the first template 910 as shown in FIG. 9A. If an input of touching or tapping an icon 912 is detected, the wearable electronic device 210 may display the first template 910 as shown in FIG. 9A on the display unit 250. In addition, if an input of touching or tapping an icon 950 is detected when the second template 920 is displayed, the content of the second template 920 may be output as voice.

Figures 10A, 10B:
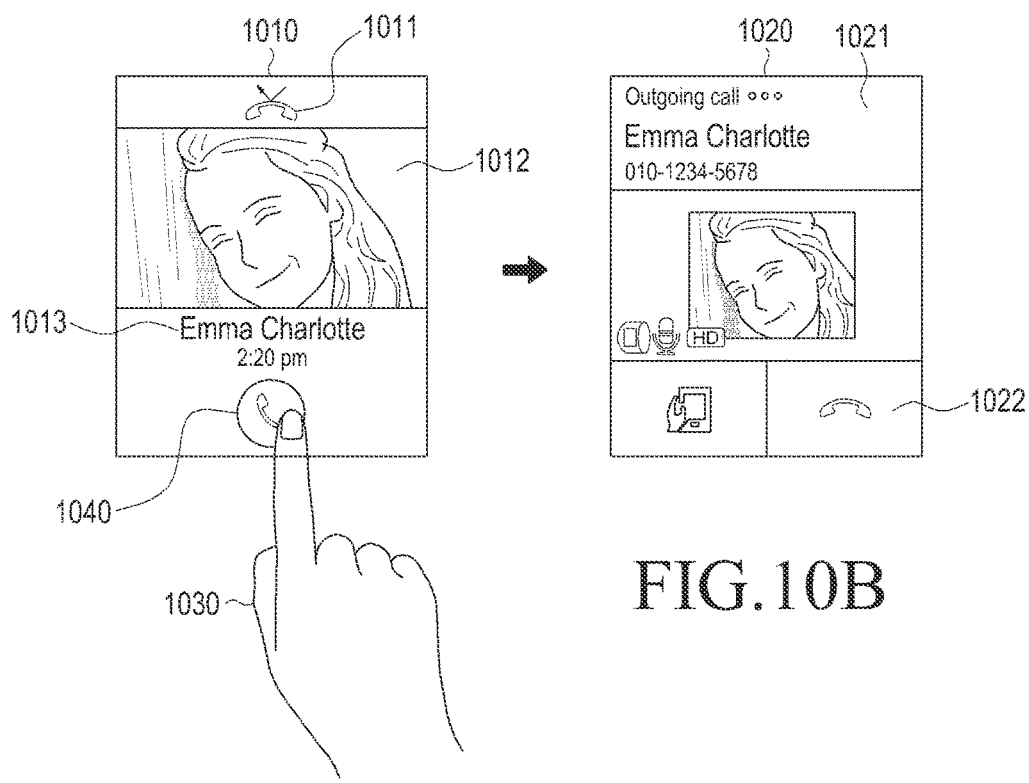
FIG. 10A illustrates a first template when an event is a missed call, and the first template is touched according to an embodiment of the present disclosure.
FIG. 10B illustrates a second template for calling a caller, which is displayed when the first template is touched according to an embodiment of the present disclosure.

FIG. 10A illustrates a first template when an event is a missed call, and the first template is touched according to an embodiment of the present disclosure, and FIG. 10B illustrates a second template for calling a caller, which is displayed when the first template is touched according to an embodiment of the present disclosure.

Referring to FIG. 10A, a first template 1010 may be displayed when an event corresponding to reception of a missed call occurs. When there is a missed call, the electronic device 101 may configure a message including the first template 1010. The first template 1010 may include a content 1011 representing a missed call, a picture 1012 of a caller who made the call, a caller's name 1013, and an icon 1040 for calling the caller. If an input 1030 of touching or tapping the icon 1040 is detected, the wearable electronic device 210 may execute a function of calling the caller to call the caller, and display a second template 1020 as shown in FIG. 10B on the display unit 250.

Referring to FIG. 10B, the second template 1020 may include a caller's name and phone number 1021, and an icon 1022 for ending the call. The wearable electronic device 210 may analyze the message received from the electronic device 101 to display the first template 1010, and detect the input 1030 of touching or tapping the icon 1040 when the first template 1010 is displayed. If the input 1030 is detected, the wearable electronic device 210 may call the caller. In addition, if an input of touching or tapping the icon 1022 is detected during sending or calling, the wearable electronic device 210 may end the call.

Figure 11:
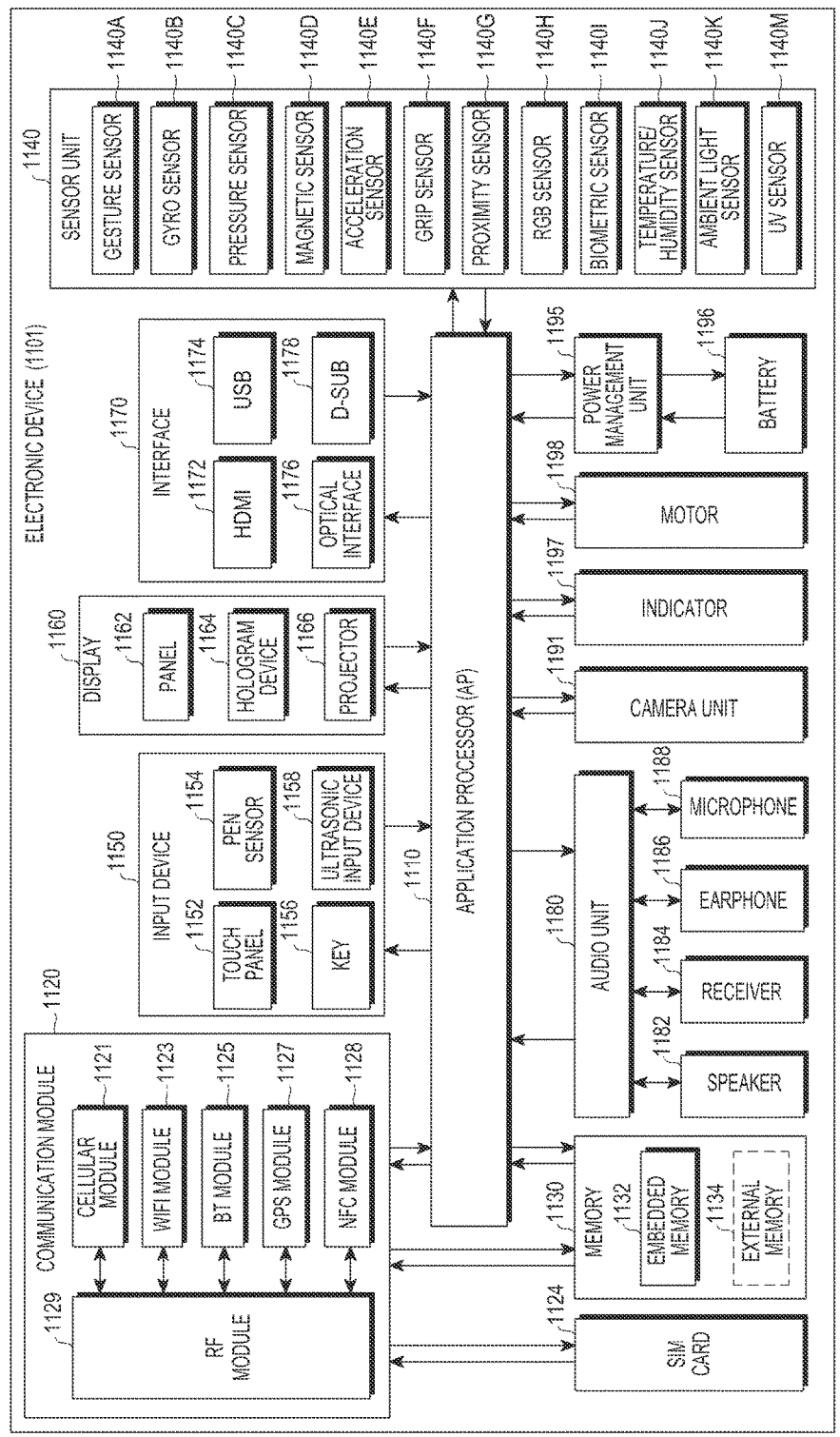
FIG. 11 is a block diagram of an electronic device according to various embodiments of the present disclosure.

FIG. 11 is a block diagram of an electronic device according to various embodiments of the present disclosure.

Referring to FIG. 11, an electronic device 1101 may configure the entire or a part of the electronic device 101 shown in FIG. 1.

The electronic device 1101 may include one or more application processors (APs) 1110, a communication unit 1120, a subscriber identification module (SIM) card 1124, a memory unit 1130, a sensor unit 1140, an input device 1150, a display unit 1160, an interface 1170, an audio unit 1180, a camera unit 1191, a power management unit 1195, a battery 1196, an indicator 1197, and a motor 1198.

The AP 1110 may drive operating system (OS) or an application program to control a plurality of hardware or software components connected to the AP 1110, and perform processing or operations of various data including multimedia data. The AP 1110 may be implemented as system on chip (SOC). According to an embodiment of the present disclosure, the AP 1110 may further include a graphical processing unit (GPU, not shown).

The communication unit 1120 (for example, the communication interface 160) may perform data transmission/reception for communication between the electronic device 1101 (for example, the electronic device 101) and another electronic device (for example, the external electronic device 104 or the server 106) connected to the electronic device 1101 through a network. According to an embodiment of the present disclosure, the communication unit 1120 may include a cellular module 1121, a Wi-Fi module 1123, a BT module 1125, a GPS module 1127, a NFC module 1128, and a radio frequency (RF) module 1129.

The cellular module 1121 may provide a voice call, a video call, a message service, or an Internet service through a communication network (for example, LTE, LTE-A, CDMA, WCDMA, UMTS, WiBro, or GSM). In addition, the cellular module 1121 may identify and authenticate an electronic device in a communication network using a subscriber identifying module (for example, the SIM card 1124). According to an embodiment of the present disclosure, the cellular module 1121 may perform a part of functions that the AP 1110 can provide. For example, the cellular module 1121 may perform a part of multimedia control functions.

According to an embodiment of the present disclosure, the cellular module 1121 may include a communication processor (CP). In addition, the cellular module 1121 may be implemented as an SoC. In FIG. 11, components, such as the cellular module 1121 (for example, the CP), the memory 1130, or the power management unit 1195, are shown as separate components from the AP 1110, however, according to an embodiment of the present disclosure, the AP 1110 may be implemented to include at least one part (for example, the cellular module 1121) of the aforementioned components.

According to an embodiment of the present disclosure, the AP 1110 or the cellular module 1121 (for example, the CP) may load a command or data received from at least one among a non-volatile memory or other components connected to the AP 1110 or the cellular module 1121, in a volatile memory, and process the command or data. In addition, the AP 1110 or the cellular module 1121 may store data received from or created by at least one of other components, in a non-volatile memory.

The Wi-Fi module 1123, the BT module 1125, the GPS module 1127, or the NFC module 1128 may include a processor to process data that is received or transmitted through the corresponding module. In FIG. 11, the cellular module 1121, the Wi-Fi module 1123, the BT module 1125, the GPS module 1127, and the NFC module 1128 are shown as separated blocks, however, according to an embodiment of the present disclosure, at least one part (for example, two or more) of the cellular module 1121, the Wi-Fi module 1123, the BT module 1125, the GPS module 1127, and the NFC module 1128 may be included in a single integrated chip (IC) or a single IC package. For example, at least one part (for example, a communication processor corresponding to the cellular module 1121 and a Wi-Fi processor corresponding to the Wi-Fi module 1123) of processors corresponding to the cellular module 1121, the Wi-Fi module 1123, the BT module 1125, the GPS module 1127, and the NFC module 1128 may be implemented as single SoC.

The RF module 1129 may perform data transmission and reception, for example, transmission and reception of RF signals. The RF module 1129 may include, as not shown in FIG. 11, a transceiver, a power amp module (PAM), a frequency filter, or a low noise amplifier (LNA). In addition, the RF module 1129 may further include an element (for example, a conductor or a conducting wire) for transmitting/receiving electronic waves in free air space for wireless communication. In FIG. 11, the cellular module 1121, the Wi-Fi module 1123, the BT module 1125, the GPS module 1127, and the NFC module 1128 are shown to share the RF module 1129, however, according to an embodiment of the present disclosure, at least one of the cellular module 1121, the Wi-Fi module 1123, the BT module 1125, the GPS module 1127, or the NFC module 1128 may perform transmission/reception of RF signals through a separate RF module.

The SIM card 1124 may be a card including a SIM, and may be inserted into a slot formed at a specific location of the electronic device. The SIM card 1124 may include unique identification information (for example, integrated circuit card identifier (ICCID)) or subscriber information (for example, international mobile subscriber identity (IMSI)).

The memory 1130 (for example, the memory 130) may include an internal memory 1132 or an external memory 1134. The internal memory 1132 may include at least one of a volatile memory (for example, a dynamic random access memory (DRAM), a static RAM (SRAM), a synchronous DRAM (SDRAM), and the like), or a non-volatile memory (for example, a one time programmable read only memory (OTPROM), a PROM, an erasable and programmable ROM (EPROM), an electrically erasable and programmable ROM (EEPROM), a mask ROM, a flash ROM, a NAND flash memory, a NOR flash memory, and the like).

According to an embodiment of the present disclosure, the internal memory 1132 may be a solid state drive (SSD). The external memory 1134 may further include a flash drive, for example, compact flash (CF), secure digital (SD), micro-SD, mini-SD, extreme digital (xD), or memory stick. The external memory 1134 may be functionally connected to the electronic device 1101 through various interfaces. According to an embodiment of the present disclosure, the electronic device 1101 may further include a storage device (or storage medium), such as a hard drive.

The sensor module 1140 may measure physical quantity, detect an operation state of the electronic device 1101, and convert the measured or detected information into electrical signals. The sensor module 1140 may include at least one of a gesture sensor 1140A, a gyro sensor 1140B, a pressure sensor 1140C, a magnetic sensor 1140D, an accelerometer 1140E, a grip sensor 1140F, a proximity sensor 1140G, a color sensor 1140H (for example, a red, green, blue (RGB) sensor), a biometric sensor 1140I, a temperature/humidity sensor 1140J, an ambient light sensor 1140K, or an ultra violet (UV) sensor 1140M. Additionally or alternatively, the sensor module 1140 may include an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown). In addition, the sensor module 1140 may include a sensor for sending a user's breath, in addition to the aforementioned sensors. The sensor module 1140 may further include a control circuit to control at least one sensor included therein.

The input device 1150 may include a touch panel 1152, a (digital) pen sensor 1154, a key 1156, or an ultrasonic input device 1158. The touch panel 1152 may be a capacitive type, a resistive type, an infrared type, or an ultrasonic type. In addition, the touch panel 1152 may further include a control circuit. If the touch panel 1152 is a capacitive type, the touch panel 1152 can recognize proximity as well as a direct touch input. The touch panel 1152 may further include a tactile layer. In this case, the touch panel 1152 may give a user tactile impression.

The (digital) pen sensor 1154 may detect a pen touch input using a method that is the same as or similar to a method of receiving a touch input from a user. In addition, the pen sensor 1154 may detect a pen touch input using a recognition sheet. The key 1156 may be a physical button, an optical key, or a keypad. The ultrasonic input device 1158 may be a device capable of detecting data by detecting sound waves with a microphone (for example, a microphone 1188) in the electronic device 1101, through an input tool of generating ultrasonic signals. The ultrasonic input device 1158 may enable RF identification (RFID). According to an embodiment of the present disclosure, the electronic device 1101 may receive a user input from an external device (for example, a computer or a server) connected to the electronic device 1101, using the communication module 1120.

The display 1160 (for example, the display 150) may include a panel 1162, a hologram 1164, or a projector 1166. The panel 1162 may be a liquid-crystal display (LCD) or an active-matrix organic light-emitting diode (AM-OLED). The panel 1162 may be implemented to be flexible, transparent, or wearable. The panel 62 may be integrated into the touch panel 1152. The hologram 1164 may show a three-dimensional (3D) image in the air using interference of light. The projector 1166 may project light onto a screen to display an image. The screen may be located inside or outside the electronic device 1101. According to an embodiment of the present disclosure, the display 1160 may further include a control circuit for controlling the panel 1162, the hologram 1164, or the projector 1166.

The interface 1170 may include, for example, an HDMI 1172, a USB 1174, a projector 1176, or a D-subminiature (D-sub) 1178. The interface 1170 may be, for example, included in the communication interface 160 shown in FIG. 1. Additionally or alternatively, the interface 1170 may include, for example, a mobile high-definition link (MHL) interface, an SD/multi-media card (MMC) interface, or an infrared data association (IrDA) interface.

The audio module 1180 may convert sound into electronic signals and vice versa. At least one component of the audio module 1180 may be, for example, included in the input/output interface 140 shown in FIG. 1. The audio module 1180 may process voice information input/output through, for example, a speaker 1182, a receiver 1184, earphones 1186, or the microphone 1188.

The camera module 1191, which captures still images or moving images, may include one or more images sensors (for example, a front sensor or a rear sensor), lenses (not shown), an image signal processor (ISP) (not shown), or a flash (for example, an LED or xenon lamp) (not shown).

The power management module 1195 may manage power of the electronic device 1101. As not shown in FIG. 11, the power management 1195 may include a power management IC (PMIC), a charger IC, or a battery or fuel gauge.

The PMIC may be installed in an integrated circuit or an SoC semiconductor. A charging method may be classified into a wired type and a wireless type. The charger IC may charge a battery, and prevent inflow of overvoltage or overcurrent from a charger. According to an embodiment of the present disclosure, the charger IC may include a charger IC for at least one of a wired charging method and a wireless charging method. The wireless charging method may be a magnetic resonance method, a magnetic induction method, or an electromagnetic wave method, and in order to perform the wireless charging method, the charger IC may include an additional circuit, for example, a coil loop, a resonance circuit, or a rectifier.

The battery gauge may measure, for example, a level of battery 1196, and a voltage, a current, or a temperature during charging. The battery 1196 may store or generate electricity, and supply power to the electronic device 1101 using the stored or generated electricity. The battery 1196 may be a rechargeable battery or a solar battery.

The indicator 1197 may display a specific state (for example, a booting state, a message state, or battery level) of the electronic device 1101 or a part (for example, the AP 1110) of the electronic device 1101. The motor 1198 may convert electrical signals into mechanical vibration. Although not shown in FIG. 11, the electronic device 1101 may include a processor (for example, a GPU) for supporting a mobile TV. The processor may process media data based on a standard of digital multimedia broadcasting (DMB), digital video broadcasting (DVB), media flow, and the like.

Each of the above-described units of the electronic device 101 according to various embodiments of the present disclosure may be configured with one or more components, and the units may be termed according to a kind of the corresponding electronic device. The electronic device 101 may include at least one of the above-described units. In addition, the electronic device 101 may omit some of the above-described units or further include another unit(s). Furthermore, some of the units of the electronic device 101 may be combined to constitute entity which performs the same functions as the corresponding units.

Figure 12:
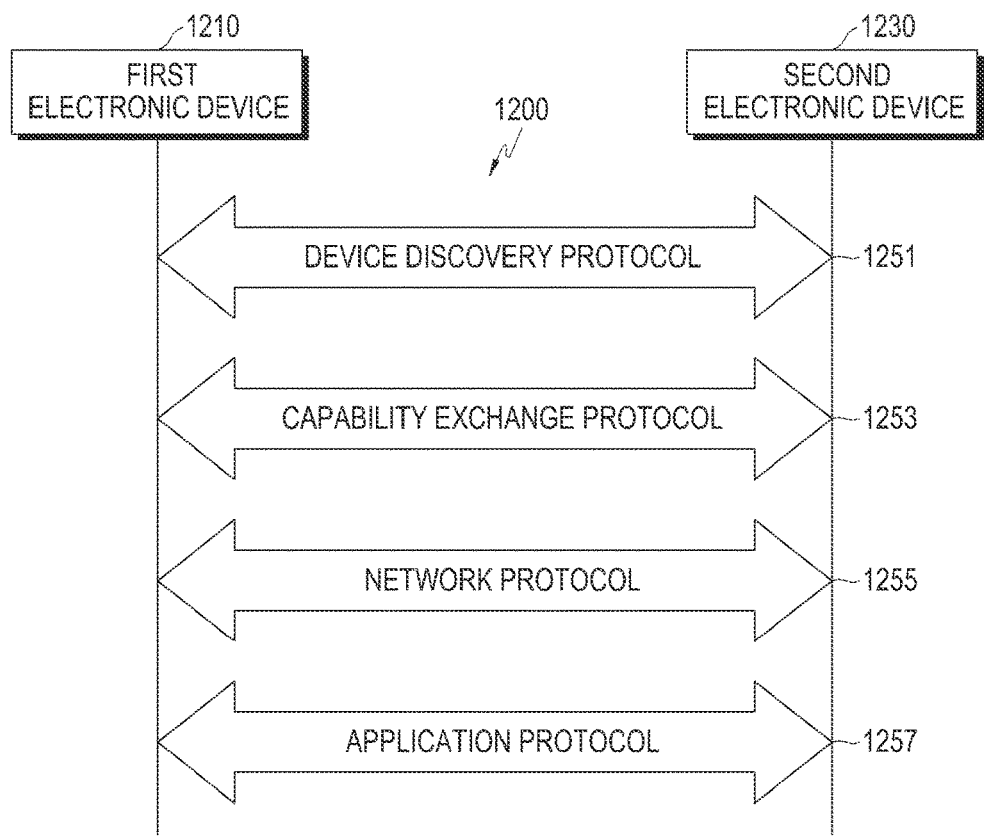
FIG. 12 illustrates communication protocols that are executed between a plurality of electronic devices according to various embodiments of the present disclosure.

FIG. 12 illustrates communication protocols that are executed between a plurality of electronic devices according to various embodiments of the present disclosure.

Referring to FIG. 12, communication protocols 1200 may include a device discovery protocol 1251, a capability exchange protocol 1253, a network protocol 1255, and an application protocol 1257.

According to an embodiment of the present disclosure, the device discovery protocol 1251 may be a protocol to enable electronic devices (for example, a first electronic device 1210 or a second electronic device 1230) to detect an external electronic device with which the electronic devices can communicate or to connect to a detected external electronic device. For example, the first electronic device 1210 (for example, the electronic device 101) may use the device discovery protocol 1251 to detect a second electronic device 1230 (for example, the external electronic device 104), through a communication method (for example, Wi-Fi, BT, or USB) that can be used by the first electronic device 1210. In order for the first electronic device 1210 to communicate with the second electronic device 1230, the first electronic device 1210 may use the device discovery protocol 1251 to acquire and store identification information of the second electronic device 1230. The first electronic device 1210 may establish communication with the second electronic device 1230, for example, based on the identification information of the second electronic device 1230.

According to various embodiments of the present disclosure, the device discovery protocol 251 may be a protocol for mutual authentication between a plurality of electronic devices. For example, the first electronic device 1210 may perform authentication between the first electronic device 1210 and the second electronic device 1230 based on communication information (for example, a media access control (MAC) address, universally unique ID (UUID), subsystem identification (SSID), or Internet protocol (IP) address) for connecting to the second electronic device 1230.

According to an embodiment of the present disclosure, the capability exchange protocol 1253 may be a protocol to exchange information related to the capabilities of services that can be supported by at least one of the first electronic device 1210 or the second electronic device 1230. For example, the first electronic device 1210 and the second electronic device 1230 may exchange information related to the capabilities of services that the first electronic device 1210 and the second electronic device 1230 provide currently, through the capability exchange protocol 1253. Information that can be exchanged between the first electronic device 1210 and the second electronic device 1230 may include identification information indicating a specific service among a plurality of services that can be supported by the first electronic device 1210 and the second electronic device 1230. For example, the first electronic device 1210 may receive identification information of a specific service that is provided by the second electronic device 1230 from the second electronic device 1230, through the capability exchange protocol 1253. In this case, the first electronic device 1210 may determine whether the first electronic device 1210 can support the specific service, based on the received identification information.

According to an embodiment of the present disclosure, the network protocol 1255 may be a protocol to control the flow of data that is transmitted and received in order to provide a service between electronic devices (for example, the first electrode device 1210 and the second electronic device 1230) communicatively connected to each other. For example, at least one of the first electronic device 1210 and the second electronic device 1230 may perform error control or data quality control using the network protocol 1255. Additionally or alternatively, the network protocol 1255 may decide a transfer format of data that is transmitted and received between the first electronic device 1210 and the second electronic device 1230. In addition, at least one of the first electronic device 1210 and the second electronic device 1230 may perform at least session management (for example, a session connection or a session disconnection) for mutual data exchange using the network protocol 1255.

According to an embodiment of the present disclosure, the application protocol 1257 may be a protocol to provide a procedure or information for exchanging data related to a service that is provided to an external electronic device. For example, the first electronic device 1210 (for example, the electronic device 101) may provide a service to the second electronic device 1230 (for example, the external electronic device 104 or the server 106) through the application protocol 1257.

According to an embodiment of the present disclosure, the communication protocol 1200 may include a standard communication protocol, a communication protocol (for example, a communication protocol designated by a communication instrument manufacturing company or a network provider) designated by an individual or group, or a combination of the protocols.

The term "module" used in the present disclosure may mean a unit including, for example, hardware, software, firmware, or a combination thereof. The "module" may be interchangeably used with another term, such as "unit", "logic", "logical block", "component", or "circuit". The "module" may be a minimum unit or a part of components integrated into one body. In addition, the "module" may be a minimum unit or a part for performing one or more functions. The "module" may be implemented mechanically or electronically. For example, the "module" may include at least one of an application-specific IC (ASIC) chip, field-programmable gate arrays (FPGAs), or a programmable-logic device, which performs certain operations, already developed or to be developed in future.

According to various embodiments of the present disclosure, at least one part of an apparatus (for example, modules or their functions) or method (for example, operations) according to various embodiments of the present disclosure may be implemented as an instruction stored in a non-transitory computer readable recording medium, for example, in the form of a programming module. When the instruction is executed by one or more processors (for example, the processor 120), the one or more processors may perform a function corresponding to the instruction. The non-transitory computer readable recording medium may be, for example, the memory 230. At least one part of the programming module may be implemented (for example, executed) by the processor 120. At least one of the programming module may include a module, a program, a routine, sets of instructions, or a processor for performing one or more functions.

Certain aspects of the present disclosure can also be embodied as computer readable code on a non-transitory computer readable recording medium. The non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The module or the programming module according to various embodiments of the present disclosure may include at least one of the aforementioned components, omit a part of the aforementioned components, or further include another component. Operations that are performed by the module, the programming module, or another component may be executed sequentially, in parallel, repeatedly, or heuristically. In addition, a part of the operations may be executed in a different order, may be omitted, or may add another operation. According to various embodiments of the present disclosure, in a storage medium storing commands, the commands may be set to enable, when the commands are executed by at least one processor, the at least one processor to perform at least one operation, and may include a first command set to display input content, a second command set to detect a second input inputted while a first input is maintained with respect to an arbitrary key of a keypad to receive the content, and a third command set to set at least one part of the displayed content to a block in response to a movement direction of the detected second input.

According to various embodiments of the present disclosure, by providing an electronic device and a method for configuring a message, it is possible to create and transmit a message optimized for a wearable electronic device that can communicate with an electronic device.

In addition, according to various embodiments of the present disclosure, a message including at least one of a first template, a second template, and an icon may be created according to the size of a display unit of the wearable electronic device, and transmitted to the wearable electronic device.

In addition, according to various embodiments of the present disclosure, by displaying or executing a message configured on the electronic device through the wearable electronic device, it is possible to improve the effect of information transfer to a user.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of configuring a message in an electronic device, the method comprising:
   detecting an event;
   identifying, by the electronic device, at least one function installed in a wearable electronic device in communication with the electronic device based on the detected event;
   configuring a message according to a size of a display of the wearable electronic device based on the detected event and the identified at least one function, the message being executable based on the identified at least one function installed in the wearable electronic device communicating with the electronic device; and
   transmitting the configured message to the wearable electronic device,
   wherein the transmitted message comprises a first template and a second template,
   wherein the first template comprises a first icon for executing the configured message based on the identified at least one function installed in the wearable electronic device, a minimum content about the detected event, and a second icon for displaying the second template, and
   wherein the second template comprises an entire content about the detected event, the first icon for executing the configured message in the identified at least one function installed in the wearable electronic device, and a third icon for displaying the first template, wherein the entire content includes the minimum content.

2. The method of claim 1,
   wherein the first template is displayed in response to reception of the transmitted message by the wearable electronic device, and
   wherein the second template is displayed if a command for displaying the entire content is received while the first template is displayed.

3. The method of claim 1, wherein the event comprises at least one among reception of a text message that is to be transmitted to the wearable electronic device, reception of a call that is to be transmitted to the wearable electronic device, reception of a missed call that is to be transmitted to the wearable electronic device, or reception of e-mail that is to be transmitted to the wearable electronic device.

4. The method of claim 1,
wherein the transmitted message is configured in at least one of a predetermined format or a user selected format, and
wherein the transmitted message is displayed or executed on the wearable electronic device.

5. The method of claim 3, wherein, if the event is at least one of a reception of a text message including text or reception of e-mail including text, the at least one function corresponding to the detected event includes outputting the text as voice.

6. The method of claim 3, wherein, if the event is any one of the reception of the call and the reception of the missed call, the at least one function corresponding to the detected event includes making a call.

7. An electronic device of configuring a message, the electronic device comprising:
a communication interface; and
at least one processor configured to:
control the communication interface to receive an event,
identify at least one function installed in a wearable electronic device in communication with the electronic device based on the detected event,
configure a message according to a size of a display of the wearable electronic device based on the received event and the identified at least one function, the message being executable based on the identified at least one function installed in the wearable electronic device communicating with the electronic device, and
transmit the configured message to the wearable electronic device,
wherein the transmitted message comprises a first template and a second template,
wherein the first template comprises a first icon for executing the configured message in the identified at least one function installed in the wearable electronic device, a minimum content about the detected event, and a second icon for displaying the second template, and
wherein the second template comprises an entire content about the detected event, the first icon for executing the configured message in the identified at least one function installed in the wearable electronic device, and a third icon for displaying the first template, wherein the entire content includes the minimum content.

8. The electronic device of claim 7,
wherein the first template is displayed in response to reception of the transmitted message by the wearable electronic device, and
wherein the second template is displayed if a command for displaying the entire content is received while the first template is displayed.

9. The electronic device of claim 7, wherein the event comprises at least one among reception of a text message that is to be transmitted to the wearable electronic device, reception of a call that is to be transmitted to the wearable electronic device, reception of a missed call that is to be transmitted to the wearable electronic device, or reception of e-mail that is to be transmitted to the wearable electronic device.

10. The electronic device of claim 7,
wherein the at least one processor is further configured to configure the message in at least one of a predetermined format or a user selected format, and
wherein the transmitted message is displayed or executed on the wearable electronic device.

11. The electronic device of claim 9, wherein, if the event is at least one of reception of a text message including text or reception of e-mail including text, the at least one function corresponding to the detected event includes outputting the text as voice.

12. The electronic device of claim 9, wherein, if the event is any one of the reception of the call and the reception of the missed call, the at least one function corresponding to the detected event includes making a call.

13. A method of executing a function on a wearable electronic device in response to a message received from an electronic device, the method comprising:
receiving, from the electronic device, a message for an event detected in the electronic device in communication with the wearable electronic device, wherein the received message comprises a first template and a second template for the detected event;
displaying the first template included in the received message;
detecting an input on a first icon included in the displayed first template; and
executing the received message based on at least function installed in the wearable electronic device in response detecting the input,
wherein the received message is configured according to a size of a display of the wearable electronic device based on the detected event and the at least one function installed in the wearable electronic device,
wherein the first template comprises the first icon for executing the received message based on the identified at least one function installed in the wearable electronic device, a minimum content about the detected event, and a second icon for displaying the second template, and
wherein the second template comprises an entire content about the detected event, the first icon for executing the received message, and a third icon for displaying the first template, wherein the entire content includes the minimum content.

14. A wearable electronic device for executing a function corresponding to a message received from an electronic device, the wearable electronic device comprising:
a communication interface;
a display; and
at least one processor configured to:
control the communication interface to receive, from the electronic device, a message for an event detected in the electronic device in communication with the wearable electronic device, wherein the received message comprises a first template and a second template for the detected event,
control the display to display the first template included in the received message,
detect an input on a first icon included in the displayed first template, and
execute the received message based on at least function installed in the wearable electronic device in response detecting the input, wherein the received message is configured according to a size of the display of the wearable electronic device based on the detected event and the at least one function installed in the wearable electronic device, wherein the first template comprises the first icon for executing the received message based on the identified at least one function installed in the wearable electronic device, a minimum content about the detected event, and a second icon for displaying the second template, and wherein the second template comprises an entire content about the detected event, the first icon for executing the received message, and a third icon for displaying the first template, wherein the entire content includes the minimum content.

* * * * *